(12) United States Patent
Rospsha

(10) Patent No.: US 12,556,204 B2
(45) Date of Patent: Feb. 17, 2026

(54) ACTIVE MULTIPLEXER

(71) Applicant: Nimrod Rospsha, Rishon Lezion (IL)

(72) Inventor: Nimrod Rospsha, Rishon Lezion (IL)

( * ) Notice: Subject to any disclaimer, the term of this patent is extended or adjusted under 35 U.S.C. 154(b) by 316 days.

(21) Appl. No.: 18/268,228

(22) PCT Filed: Jan. 16, 2022

(86) PCT No.: PCT/IL2022/050060
§ 371 (c)(1),
(2) Date: Jun. 18, 2023

(87) PCT Pub. No.: WO2022/153311
PCT Pub. Date: Jul. 21, 2022

(65) Prior Publication Data
US 2024/0056107 A1   Feb. 15, 2024

Related U.S. Application Data

(60) Provisional application No. 63/138,500, filed on Jan. 17, 2021.

(51) Int. Cl.
H04B 1/00 (2006.01)
H04L 5/14 (2006.01)

(52) U.S. Cl.
CPC ......... H04B 1/0057 (2013.01); H04L 5/1461 (2013.01)

(58) Field of Classification Search
CPC .... H03H 7/465; H04B 1/0057; H04B 1/0458; H04B 1/18; H04L 5/1461
See application file for complete search history.

(56) References Cited

U.S. PATENT DOCUMENTS

| | | | | |
|---|---|---|---|---|
| 2004/0124932 A1* | 7/2004 | Lu | ......... | H03K 3/0315 331/57 |
| 2004/0127178 A1* | 7/2004 | Kuffner | ......... | H01P 1/20 455/133 |
| 2009/0147904 A1* | 6/2009 | Do | ......... | H03L 7/0891 375/376 |
| 2010/0259364 A1* | 10/2010 | Man | ......... | G06K 7/10356 340/10.1 |
| 2013/0165067 A1* | 6/2013 | DeVries | ......... | H04B 1/123 455/307 |
| 2014/0055210 A1 | 2/2014 | Black et al. | | |
| 2015/0092625 A1 | 4/2015 | Leipold et al. | | |
| 2016/0013831 A1* | 1/2016 | Lea | ......... | H04B 7/0695 455/562.1 |
| 2016/0049965 A1 | 2/2016 | Khlat | | |

(Continued)

*Primary Examiner* — Kashif Siddiqui

(57) ABSTRACT

A radiofrequency (RF) system may comprise a duplexer or multiplexer, e.g., when the transmitted signal frequency is different from the receiving frequency in a RF communication system, a duplexer may combine the transmitter and the receiver into the same antenna. In other possible RF communication systems, where the transmit (Tx) and receive (Rx) paths utilize the same frequencies (which are duplexed in time domain), a multiplexer may be used to connect different transmitters, receivers and/or transceivers that are using different frequencies, into one common/antenna port. A multiplexer may be used to share an antenna between multiple transceivers at different frequencies. In some embodiments, the multiplexer may be tunable to different frequencies during operation.

13 Claims, 16 Drawing Sheets

(56) References Cited

U.S. PATENT DOCUMENTS

| | | | |
|---|---|---|---|
| 2016/0127063 A1* | 5/2016 | Leipold | H04B 1/40 370/343 |
| 2018/0063031 A1 | 3/2018 | Wloczysiak et al. | |
| 2018/0069741 A1* | 3/2018 | Kummetz | H04L 27/28 |
| 2019/0013790 A1 | 1/2019 | Ayranci et al. | |
| 2019/0334570 A1* | 10/2019 | Hwang | H04B 1/00 |

* cited by examiner

ACTIVE MULTIPLEXER

RELATED APPLICATION/S

This application claims the benefit of priority under 35 USC § 119(e) of U.S. Provisional Patent Application No. 63/138,500 filed 17 Jan. 2021, the contents of which are incorporated herein by reference in their entirety.

FIELD AND BACKGROUND OF THE INVENTION

The present application is generally in the field of signal multiplexing, and particularly relates to radiofrequency (RF) multiplexing.

US Patent Publication No. 2004/0127178 appears to disclose a, "tunable duplexer in a communication system. The tunable duplexer includes a tunable receiver filter, a tunable transmitter filter, a variable receiver phase shifter, and variable transmitter phase shifter. Each filter and phase shifter is optimized based on characteristics of impedance within the duplexer. The duplexer may be adjusted to changing environments or desired changes in the frequency of operation, reducing circuitry architecture and providing greater flexibility in communication function. The method commences by tuning tunable filters within the duplexer and then optimizing phase shifters within the duplexer for adjusting impedance matching with antenna and isolating the receiver from the transmitter during duplexing operations. Optimizations and calibration may be performed during manufacture, upon initialization of the system, or during operation of the communication device. The modes of calibration and operation may be generalized as "predefined" (for known environments and frequencies) or "adapt," where antenna impedance or frequency of operation changes."

SUMMARY OF THE INVENTION

According to an aspect of some embodiments of the invention, there is provided a frequency multiplexing system including: a plurality of RF ports and a single common port; a frequency detection unit configured to detect a frequency of signals provided over at least one of the plurality of RF ports and the common port; a tunable multiplexer including a respective plurality of tunable signal paths, the tunable multiplexer configured to adjust at least one of the plurality of tunable signal paths in accordance with the frequency of signals detected by the detection unit, to thereby enable signals transmission between the single common port and the plurality of RF ports.

According to some embodiments of the invention, the plurality of tunable signal paths comprise at least one tunable filter.

According to some embodiments of the invention, the plurality of tunable signal paths comprise at least one tunable signal propagation length module.

According to some embodiments of the invention, the plurality of tunable signal paths comprise at least one tunable matching circuit.

According to some embodiments of the invention, at least one of the plurality of tunable signal paths includes a pair of tunable bandpass filters.

According to some embodiments of the invention, at least one of the plurality of tunable signal paths includes two couplers.

According to some embodiments of the invention, each of the two couplers is a hybrid coupler.

According to some embodiments of the invention, the system further includes a tunable balancing load.

According to some embodiments of the invention, the system of any one includes a tunable multiplexer junction unit configured to combine the signals from the plurality of tunable signal paths.

According to some embodiments of the invention, the system of any one further includes a network analyzer configured to check frequency response of the tunable multiplexer and a set tunable parameters thereof accordingly.

According to some embodiments of the invention, the system of any one further includes a control unit configured and operable to change settings of at least one of the plurality of tunable signal paths in accordance with a frequency of signals detected by the detection unit.

According to some embodiments of the invention, the system further includes a data structure including setting parameters for the plurality of tunable signal paths, and wherein the control unit is configured and operable to select setting parameters from the data structure for change of the settings of the at least one of the tunable signal paths.

According to some embodiments of the invention, the tunable multiplexer includes a switching matrix configured to change an order of the signals frequencies provided over the plurality of RF ports into a new frequencies order fed into the plurality of tunable signal paths.

According to an aspect of some embodiments of the invention, there is provided a method of detecting frequency of a transceiver including: enforcing activation of the transceiver to transmit a short transmission pulse whenever operational frequency thereof is changed, and detecting a frequency of the short transmission pulse.

According to an aspect of some embodiments of the invention, there is provided a datastructure, for tuning RF paths of a frequency multiplexing system, the datastructure for determination of one or more parameters for tuning the frequency multiplexing system based on a plurality of RF frequencies for the frequency multiplexing system.

According to an aspect of some embodiments of the invention, there is provided a method of adjusting a tunable multiplexer including: Supplying of a network analyzer; checking response of a tunable multiplexer with the network analyzer; and adjusting its tunable paths accordingly.

According to some embodiments of the invention, the method further includes self calibration of the network analyzer using an inline element.

According to some embodiments of the invention, the method further includes: tuning the tunable multiplexer according to at least one of a detected frequency and a database.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIG. 1 is a block diagram schematically illustrating a RF system according to possible embodiments utilizing a single antenna by a plurality of transceivers connected thereto through an active multiplexer device;

FIGS. 2 and 3 schematically illustrate a frequency detection technique deployable in RF systems utilizing the multiplexer according to some possible embodiments;

DESCRIPTION OF SPECIFIC EMBODIMENTS OF THE INVENTION

Figure 1:
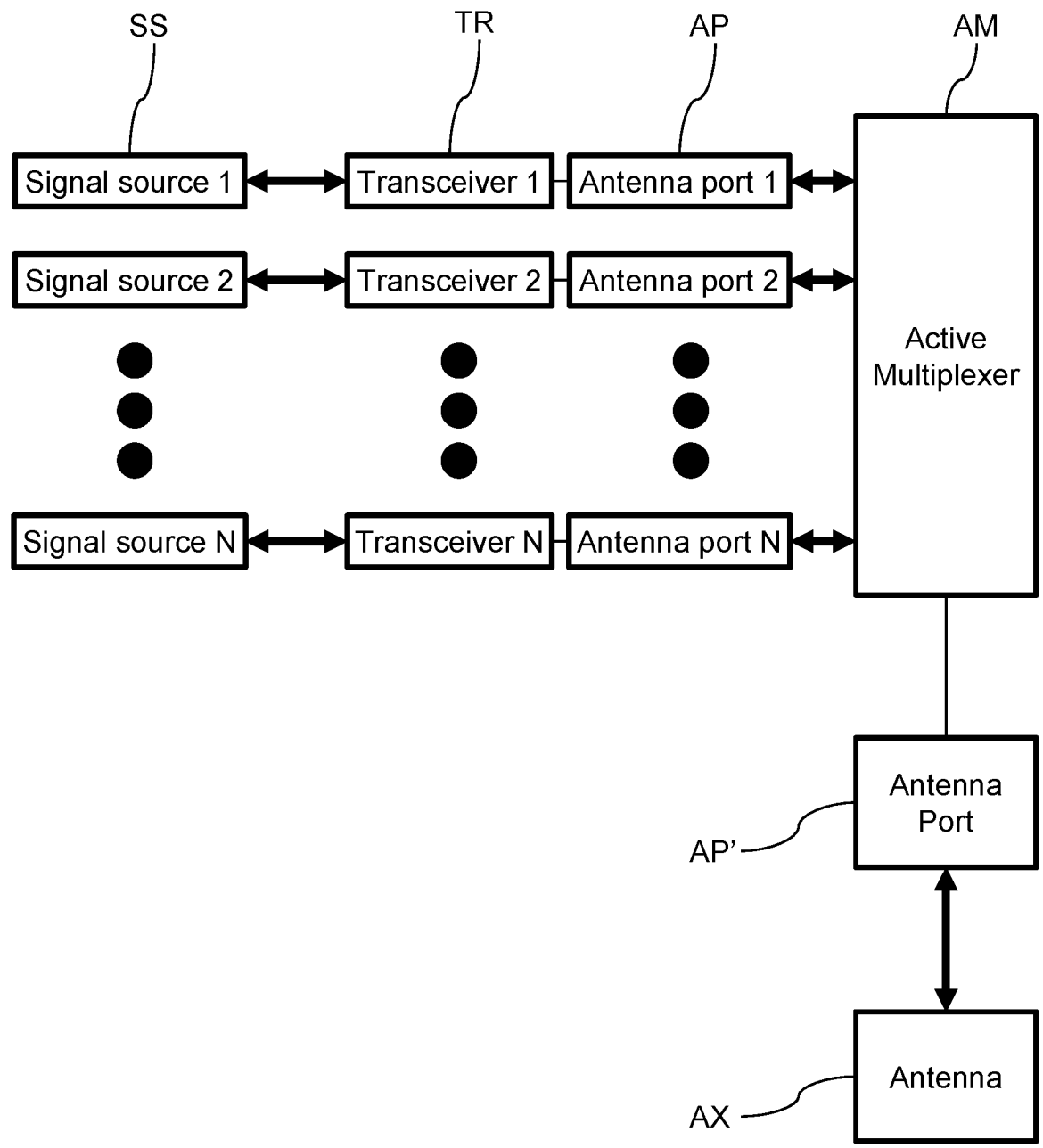

The present application is generally in the field of signal multiplexing, and particularly relates to radiofrequency (RF) multiplexing.

Overview

In some embodiments, a duplexer includes an electronic device configured to allows bi-directional communication over a single communication path. A typical duplexer/diplexer comprises three ports, including a common/antenna port and two signal receive/transmit (Rx/Tx) ports. The two Rx/Tx signal ports of the duplexer/diplexer may be either two transmit (Tx) ports, two receive (Rx) ports, one receive (Rx) port and one transmit port (Tx), two bidirectional ports (Tx&Rx), or one bidirectional (Tx&Rx) port and one receive (Rx) or transmit port (Tx). For example, a duplexer can be used to isolate different two bi-directional (Tx&Rx) ports, while permitting them to share a common antenna. In the context of the present application, unless otherwise stated, a duplexer is a frequency domain based device, and hence the two bidirectional (Tx&Rx) ports pass different frequencies to the antenna port. In some embodiments, a duplexer facilitates reduced loss between each bidirectional (Tx&Rx) port to the common/antenna port, while allowing isolation between the two bidirectional (Tx&Rx) ports. Optionally, a duplexer utilizes frequency filtering and impedance matching techniques in order to fulfill these properties.

Multiplexers are a larger form of duplexers, and/or diplexers. While duplexers and diplexers typically have two bidirectional (Tx&Rx) ports and one common/antenna port, for combining two separate pass band frequencies to one common port, a multiplexer typically has multiple (usually three or more) bidirectional (Tx&Rx) ports and one common/antenna port, for combining multi separate pass band frequencies to one common/antenna port.

In some embodiments, a multiplexer is a bidirectional frequency device. For example, once an RF signal is set at the bidirectional ports (generally referred to herein as RF ports), the signal passes to the common port with electrical changes (attenuation, delay, phase etc.) according to each path spectral characteristics. Optionally, on the other hand, once the RF signal is set at the common/antenna port, the signal passes to each bidirectional port with electrical change according to each path spectral characteristics.

In some embodiments of the present disclosure, there might be situations in which one or more RF ports of the multiplexer are used as RF signal input ports and one/several of its RF ports are used as RF signal output ports. For example, this may include several frequency bands at the common/antenna port which will be input RF signals, while the other frequency band at the common/antenna port will be output RF signals. It is noted that in the context of the present application, although there might be examples or description relating to the RF ports as inputs, or outputs, in some embodiments, these ports may be used as inputs, outputs, or both inputs and outputs simultaneously.

A radiofrequency (RF) system may comprise a duplexer or multiplexer, e.g., when the transmitted signal frequency is different from the receiving frequency in a RF communication system, a duplexer may combine the transmitter and the receiver into the same antenna. In other possible RF communication systems, where the transmit (Tx) and receive (Rx) paths utilize the same frequencies (which are duplexed in time domain), a multiplexer may be used to connect different transmitters, receivers and/or transceivers that are using different frequencies, into one common/antenna port.

In situations wherein transmitters, receivers and/or transceivers change their operation frequency, for example, due to frequency hopping purposes and/or other frequency allocation needs, the frequency pass band structure of the multiplexer may be changed and adjusted to the new frequency allocation. Proper adjustment may be useful to achieve the proper electrical properties, such as reduced pass loss and increased isolation between the RF ports.

An aspect of some embodiments of the current invention relates to a frequency multiplexing system. In some embodiments, the frequency multiplexing system comprises a plurality of RF (e.g., bidirectional/unidirectional) ports and/or a single common/antenna (e.g., bidirectional/unidirectional) port. Optionally, the system may include a frequency detection unit configured to detect a frequency of signals provided over at least one of the plurality of RF ports and/or said single common/antenna port. Optionally, the system includes a tunable multiplexer. For example, the tunable multiplexer may include a respective plurality of tunable signal paths/channels. Optionally, the tunable multiplexer is configured to adjust at least one of its tunable signal paths in accordance with the at least one detected frequency. Tuning the signal path optionally enables proper signal passage between the single common/antenna port and the plurality of RF ports and/or vice versa. Optionally, but in some embodiments preferably, the tunable signal paths comprise a tunable filter and/or a tunable signal propagation length module and/or a phase shifter and/or a tunable matching circuit.

The system comprises, in some embodiments, a tunable multiplexer junction. The multiplexer junction may be configured to combine the signals from the tunable signal paths.

The system comprises in some embodiments a network analyzer configured to check frequency response of the tunable multiplexer and/or of the external ports (i.e., the RF ports and the common/antenna port). The network analyzer optionally sets tunable parameters of the multiplexer and/or ports according to the frequency response. Additionally, or alternatively, a control unit is used to change settings of at least one of the tunable signal paths in accordance with the at least one detected frequency. In some embodiments a data structure of setting parameters is used for setting the tunable signal paths. For example, the data structure may include database and/or formulation The control unit is optionally configured and/or operable to select setting parameters from a database (and/or formulation) for changing of the settings of the at least one of the tunable signal paths. The tunable multiplexer comprises, in some embodiments, a switching matrix configured to change an order of the signals frequencies provided over the plurality of RF ports into a new frequencies order. The reordered signals may be fed into the tunable signal paths.

An inventive aspect of the subject matter disclosed some embodiments herein relates to a method of detecting frequency of a transceiver. The method comprising enforcing activation of the transceiver to transmit a short transmission pulse. For example, the pulses may be transmitted whenever operational frequency thereof is changed. The method may include detecting a frequency of the short transmission pulse.

An inventive aspect of the subject matter disclosed in some embodiments herein relates to a database and/or formulation for tuning RF paths of a frequency multiplexing system and/or calibration of the network analyzer. The database/formulation is optionally configured for determination of one or more parameters for tuning the frequency multiplexing system based on a plurality of RF frequencies for the frequency multiplexing system.

An inventive aspect of the subject matter disclosed in some embodiment herein relates to the use of a network analyzer for checking response of a tunable multiplexer and/or adjusting its tunable paths accordingly. For example, the network analyzer maybe used for self-calibration and/or tuning of the tunable multiplexer.

SPECIFIC EMBODIMENTS

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

One or more specific and/or alternative embodiments of the present disclosure will be described below with reference to the drawings, which are to be considered in all aspects as illustrative only and not restrictive in any manner. It shall be apparent to one skilled in the art that these embodiments may be practiced without such specific details. In an effort to provide a concise description of these embodiments, not all features or details of an actual implementation are described at length in the specification. Elements illustrated in the drawings are not necessarily to scale, or in correct proportional relationships, which are not critical. Emphasis instead being placed upon clearly illustrating the principles of the invention such that persons skilled in the art will be able to make and use the frequency active multiplexers, once they understand the principles of the subject matter disclosed herein. This invention may be provided in other specific forms and embodiments without departing from the essential characteristics described herein.

There are situations in which serval transceivers of a RF system are located in a same joint location. In such cases the transceivers can be configured to transmit and receive information over radio frequency signals that pass the information in a wireless form. Such transceivers could be used for voice, audio, images, signals and/or any other possible data media communication, and they may be also utilized to implement only a half of their transceiver usage i.e., as a transmitter only, or as a receiver only. In some RF systems, the transceiver frontend is connected through a RF waveguide to an antenna. In very high frequencies (VHF), the RF waveguide is often implemented by a coax cable. For higher frequencies (e.g., radar systems) a rectangular waveguide, or a circular waveguide, or any other suitable waveguide configuration may be used to implement the required connectivity. In the embodiments disclosed herein, this connectivity is typically implemented by means of coax cables, but it may be implemented utilizing other waveguide structures. In some RF systems, each Transceiver is connected by a respective waveguide to a corresponding at least one antenna to transmit and receive the radiated RF signals.

Figure 2:
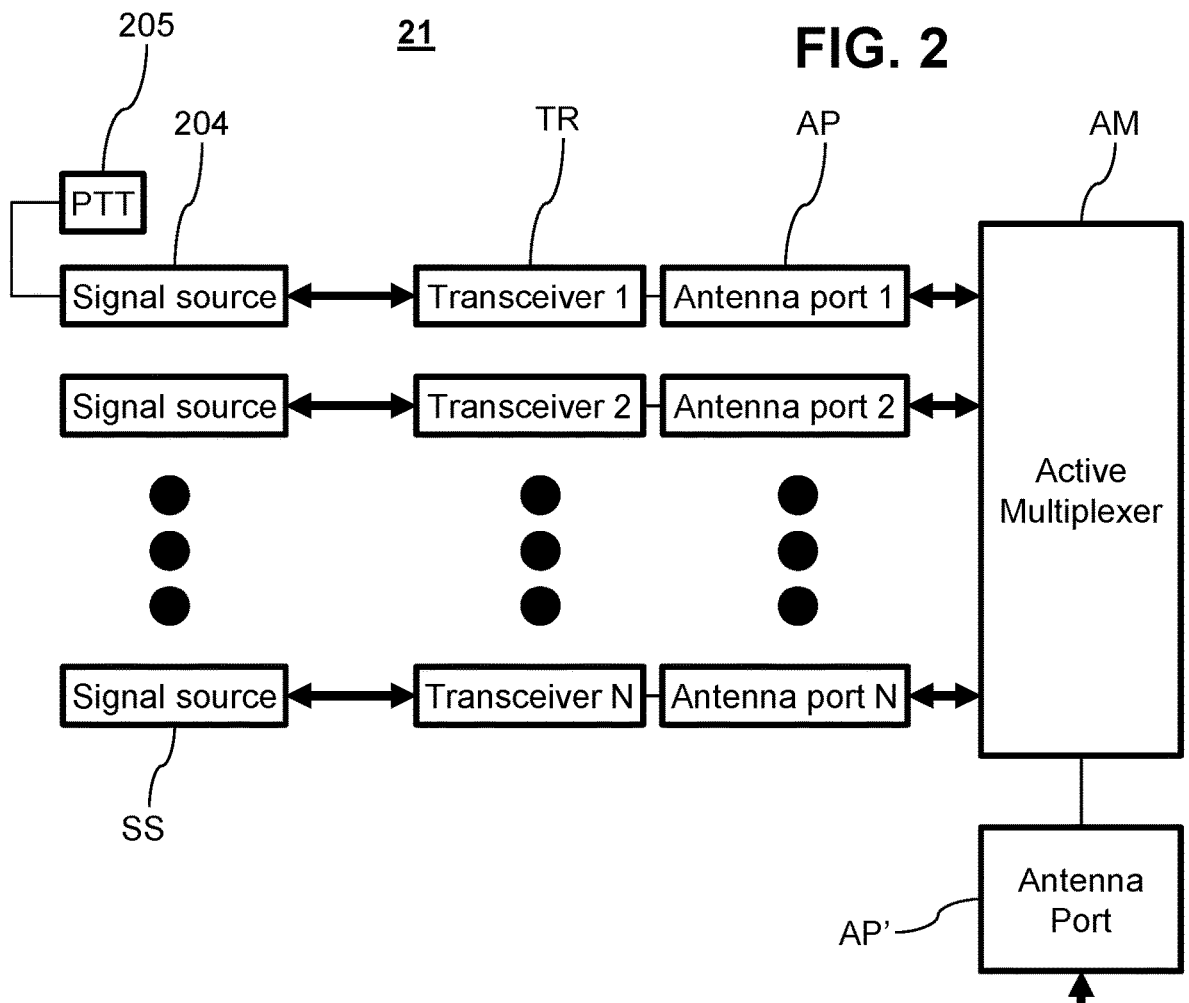

In some embodiments, a system 20 uses a single antenna for a plurality of (e.g., an arbitrary number N of transceivers TR, (e.g., Transceiver 1, Transceiver 2, . . . Transceiver N)). Optionally, each transceiver TR may be of any kind. For example, a pass band frequency of a transceiver TR may be changed during operation with the single antenna (AX in FIG. 1). Multiplexer designs disclosed herein may facilitate this and will be referred to herein as an active multiplexer AM. Accordingly, with the active multiplexer AM disclosed herein an RF system with multiple antennas can be modified to operate with a single antenna AX, as depicted in FIG. 1. For example, multiple transceivers TR are connected to the multiplexer AM each via a respective antenna port AP. Optionally, the RF systems uses a wideband antenna AX. Optionally, the antenna AX is connected to the multiplexer through an antenna port AP'. The Transceivers TR may be implemented by any suitable transceiver type. Optionally the RF frequency in which the transceiver TR operates can be changed while it is being operated. In FIGS. 1 and 2 the heavy double arrowed lines show the path of a signal. Optionally the signal may be RF and/or another form (e.g., optical). In some embodiments, the signal may pass through a cable and/or wirelessly.

Several techniques may be used in order to adjust the frequency of operation of the active multiplexer AM.

In possible embodiments, an open loop approach is adopted to enable a procedure in which the frequencies of operation of the active multiplexer AM can be externally adjusted e.g., by a command from one of the Transceivers TR, or by, for example, an operator of the Transceiver TR.

In some embodiments, a closed loop approach may be utilized. For example, the loop is optionally based on an internal unit that detects the operating frequency, or frequency band of a bidirectional port of the active multiplexer AM. Once the frequency of operation of each bidirectional port of the active multiplexer AM is known, a control and management unit (e.g., CM 505 in FIG. 5) may be used to set the parameters of a tunable multiplexer (e.g., TM in FIGS. 4A-4C and/or 5). The system may optionally adapt its RF paths to the various different frequencies of operation e.g., based on a formulation and/or lookup table provided in/with the active multiplexer AM constituting a tuning/calibration database for the AM operation. The tuning/calibration database may be prepared during the active multiplexer AM's product development and/or production processes.

Figure 4A:
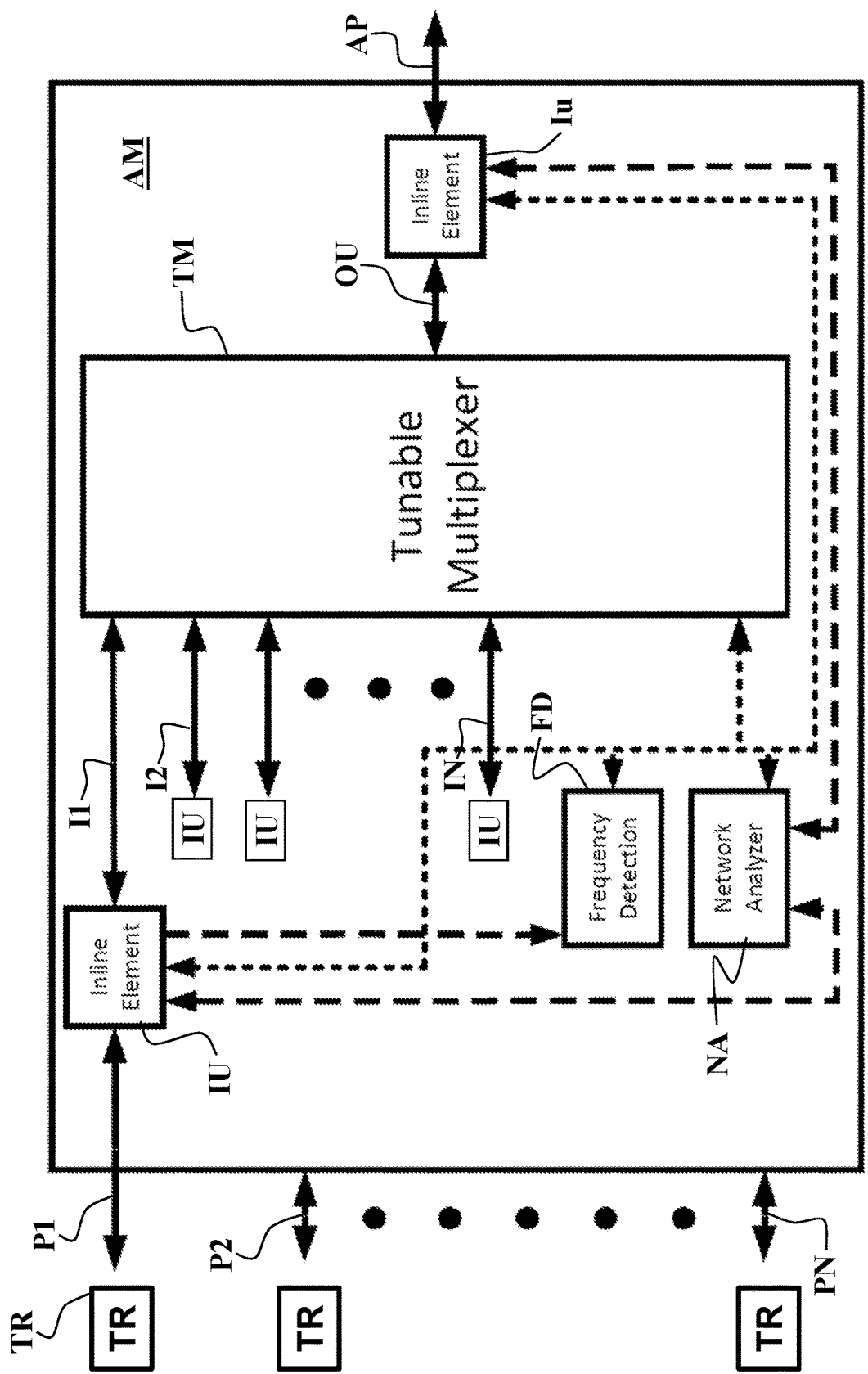
FIGS. 4A to 4C are block diagrams schematically illustrating a RF system deploying frequency multiplexing according to possible embodiments for utilization of a single antenna by a plurality of transceivers.
Figure 4B:
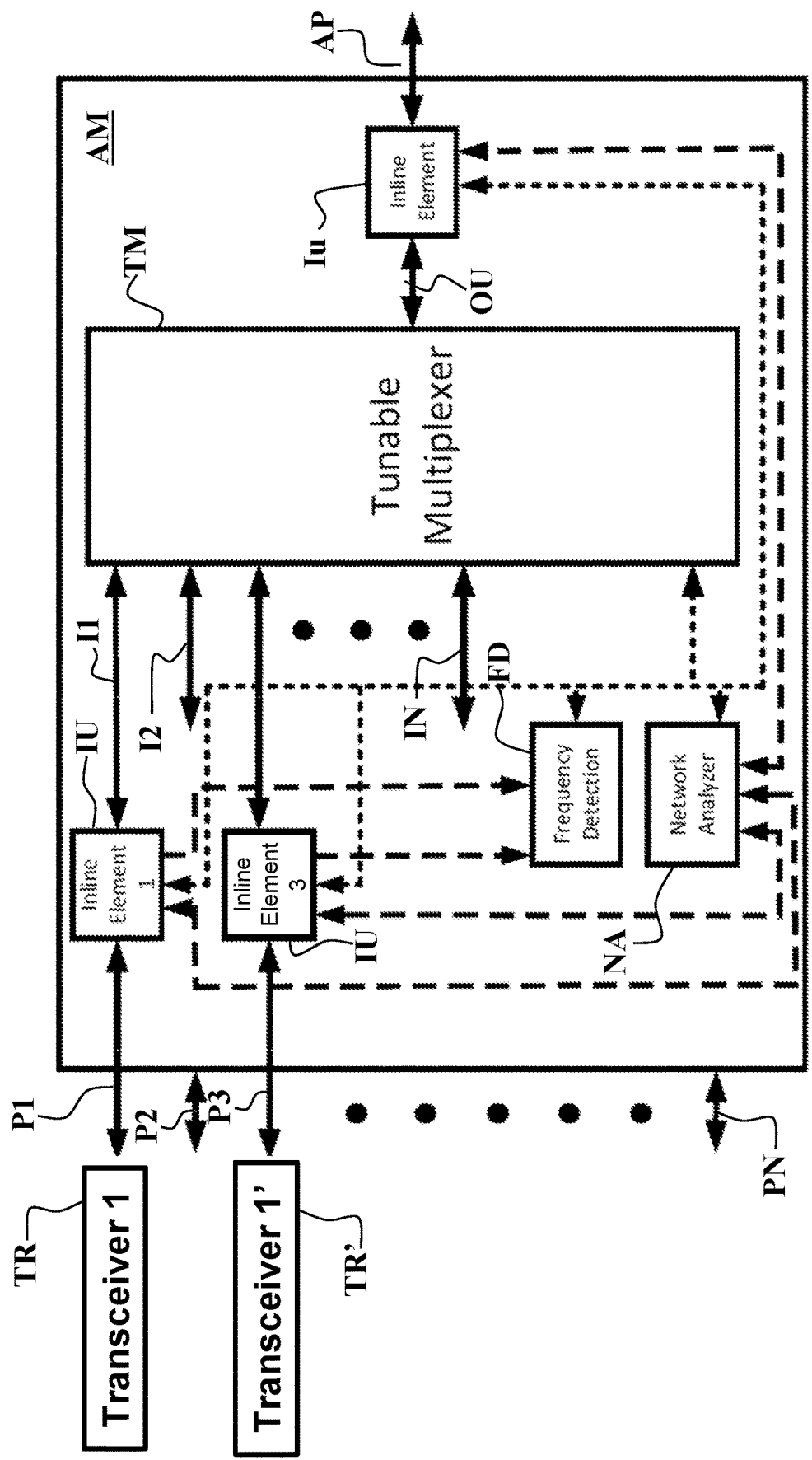
Figure 4C:
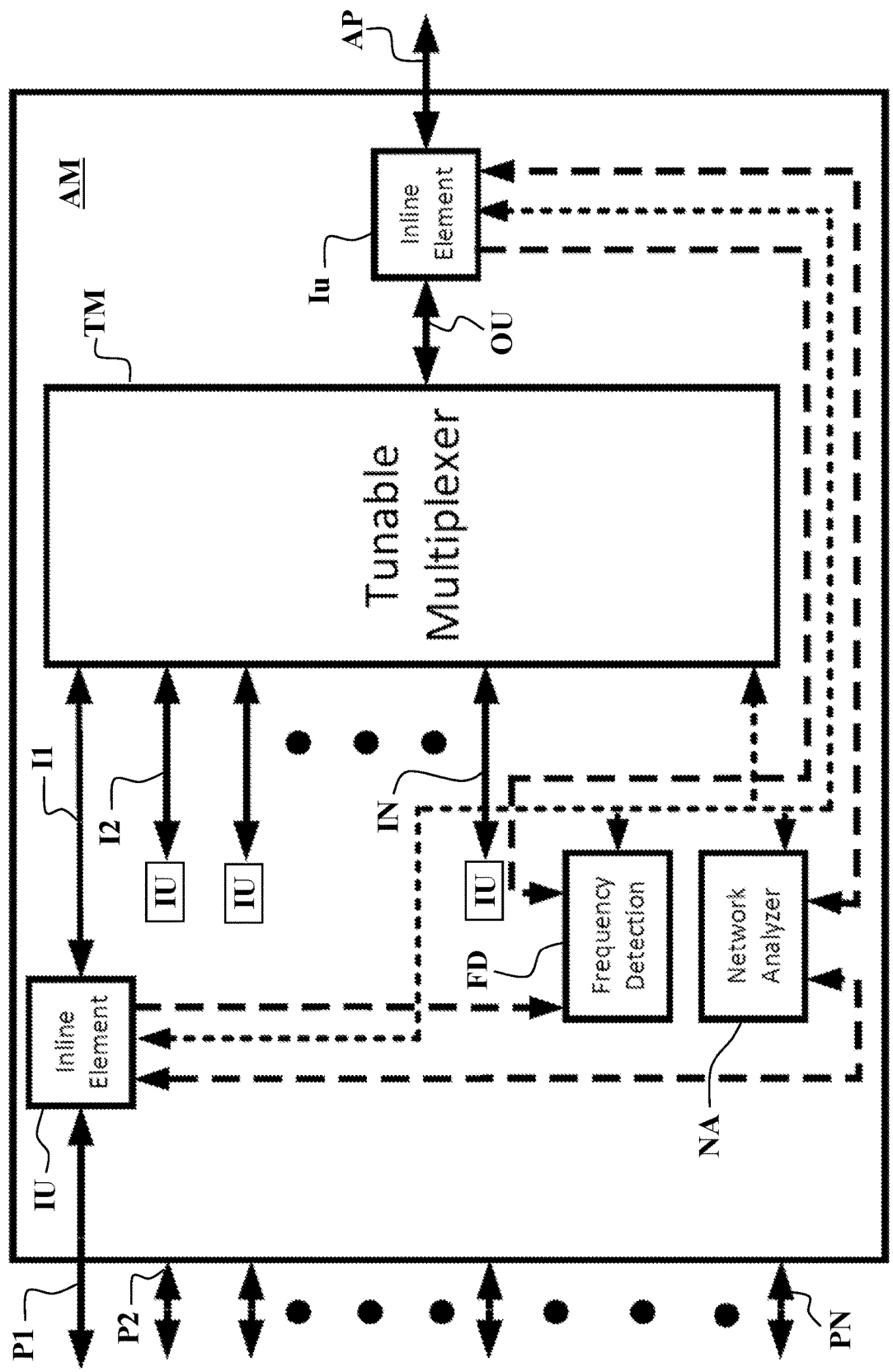

In embodiments, a frequency detection unit FD may be used in order to check the frequency of operation of Transceivers N (either in their transmit or receive modes or operation), for example as shown in FIG. 4A to 4C. In this non-limiting example, a portion of the analog (Tx or Rx) RF signal at the RF ports P1, P2, . . . , PN (collectively referred to herein as port Pn where the lower case italic n represents any integer between 1 and N where the uppercase N is the total number of units (e.g., ports)) and the common/antenna port AP is inspected by the frequency detection unit FD via the inline units IU and Iu. Optionally, the inline units IU and Iu can be configured to couple small portion of the input/output RF signals, or switch it, into the frequency detection unit FD. The inline units IU and Iu can be implemented by, but not limited to, RF coupler, RF switch, RF splitter, bi-directional coupler, hybrid coupler, or suchlike. The frequency detection unit FD can be implemented by, but not limited to, frequency counter, spectrum analyzer and/or such like. Solid double arrowed lines in FIGS. 4A-4C and 5 represent the main signal path. Dotted double arrowed lines in FIGS. 4A-4C and 5 represent a control and management signal path. Dashed double arrowed lines in FIGS. 4A-4C represent a secondary RF signal path. Connections to transceivers (P1-PN) are shown on the left side of FIGS. 4A-4C and connections to an antenna via an antenna port AP is shown on the right side of FIGS. 4A-4C.

Figure 3:
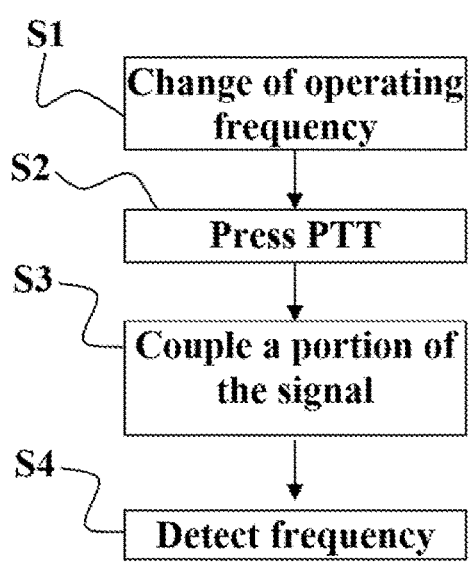

A possible approach to detect the frequency of the RF input signal, is to wait until one of the Transceivers 1-N is changed into its transmit (Tx) mode. Another possible approach to detect the RF frequency of the input signal, for example as demonstrated in system 21 of FIGS. 2 and 3, which may be used with for example voice/audio transceivers, is based on enforcement of a frequency detection procedure, in which once the frequency of a Transceiver 1-N is changed (S1) by the operator of the transceiver. For example, for the Transceiver 1 the operator activates the transceiver e.g., signal source 204 by pressing the push-to-talk (PTT) button 205 or any such transmission activation mechanism, as demonstrated, for example, in FIG. 3. The RF signal generated by the transceiver is then coupled (S3) (for example, by an inline unit) to the frequency detection unit of the active multiplexer AM, which optionally identifies the new operational frequency of the transceiver, which is then used for the tuning/calibration of the active multiplexer AM. This frequency detection process may be automated, for example, by coupling to the frequency setting mechanism of the Transceivers 1-N to an inspection unit configured to detect change of operating frequency events, and manipulate the Transceivers 1-N, or their activation mechanism, to generate a short transmission signal for frequency detection by the frequency detection unit.

In some embodiments, frequency detection, which may be implemented, for example, with data communication transceivers, is by simulating a data communication stream in the main communication path of the system, or to create a demo communication path, in which the RF signal is directed to the frequency detection unit FD of the active multiplexer AM for the frequency detection, without reaching the antenna AX for example of the system 20 and/or 21. An example, of such an approach is demonstrated in FIG. 4B. This specific and non-limiting example is usable for example with hopping frequency transceiver applications, in which the need to enforce transmission by the transceiver TR (Transceiver 1) may occur rapidly due to the quick frequency change. In some embodiments an additional transceiver TR' (Transceiver 1') of the same frequency hopping scheme is connected to the active multiplexer AM, for example, this may avoid loss of received information. In some embodiments, the inline unit IU (e.g., Inline element 3) of the RF port P3 is set to continuously connect the additional transceiver TR' to the frequency detector FD all the time i.e., it is never get disconnected from the frequency detector FD. For example, the inline unit IU of RF port P1 (Inline element 1) connects the transceiver TR to its filtering path in the tunable multiplexer TM. In this configuration the inline unit IU of RF port P3 is used for the detection of the frequencies such as frequency hopping scheme. The control module (e.g., CM in FIG. 5) is optionally configured to set tunable elements (such as TF1-TFN, PL1-PLN, MC1-MCN, LC1-LCN, MJ in FIG. 5) of a tunable multiplexer, For example, TF1, PL1, MC1, LC1, MJ of signal path 1. Tuning may be according to frequency detection information obtained by the frequency detector FD from the inline unit IU of RF port P3. In some embodiments, the frequency detection does not enforce Transceiver A (TR) to change its mode of operation into the transmit mode (Tx), such that received information is not lost.

Figure 6:
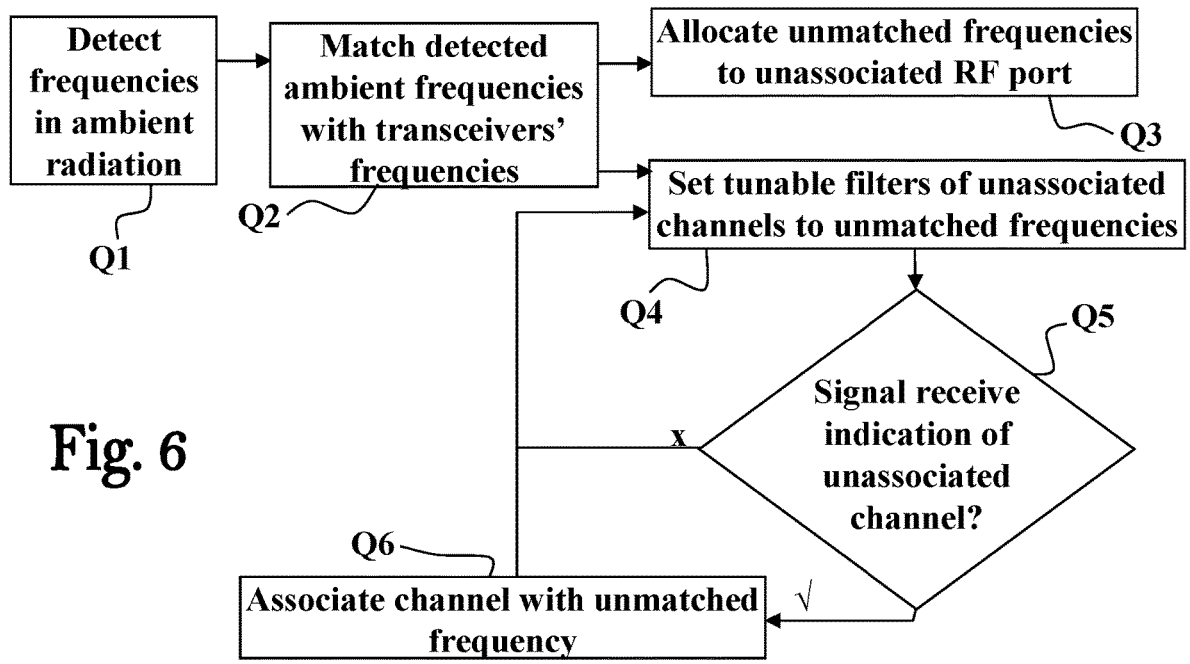
FIG. 6 is a flow chart demonstrating a frequency allocation process according to possible embodiments.

FIG. 4C shows yet another frequency detection technique, in which ambient radiation in the antenna's environment is sensed using the inline unit Iu at the antenna port AP. For example, as shown in FIG. 6, in this embodiment the received signals are passed to the frequency detector FD (e.g., using an internal spectrum analyzer), from the antenna port AP using the inline unit Iu, for detection of the ambient frequencies at the antenna environment (Q1). Since the control module CM is aware of the frequency bands previously of the RF ports Pn, as detected utilizing the inline units IUs of the RF ports PN and the frequency detector FD, the control module CM can be configured to match them with the detected ambient frequencies (Q2) and neglect the RF frequencies that are mutual to the detection in the ambient radiation and on the RF ports Pn. If one (or more) frequency detected in the ambient radiation is left unmatched to one of the frequencies associated with the RF ports Pn, the control module CM will allocate it to the unassociated frequency signal path/channel (Q3) i.e., which transceiver port's Pn is not associated with any RF frequency. If more than one channel Pn is in the receive mode i.e., their operation frequency is not known (Q5), then the control module CM can perform a trial-and-error process (Q4 to Q6) using the allocated channel tuning options (Q4, by setting the tunable filter to the frequency left unmatched) and the transceiver indication for received signal as the target function (Q5 and Q6).

It is noted that use of the different frequency detection techniques disclosed herein, and their implementations, are not limited to the active multiplexer AM devices disclosed herein, but can be similarly used to detect the tuned frequency of any radio communication device, such as of transceivers, transmitters, receivers etc. for digital, analog, voice, data etc.

As shown in FIGS. 4A to 4C, the active multiplexer, for example, AM of system 20 and/or 21, may comprise in some embodiments the tunable multiplexer TM, inline units IU and Iu, frequency detection unit FD, and a network analyzer NA.

The inline unit IU can be implemented by signal couplers and/or a controllable switch device and suchlike, where its function may include:

1) to couple, or to switch, the signal from its respective RF port Pn, and from the antenna port AP, into the frequency detection unit FD;
2) to couple, or to switch, signals from and to the network analyzer unit NA; and
3) to couple, or to switch, the signal from the RF port Pn into the tunable multiplexer TM.

As shown, for example, in FIGS. 4A to 4C, a respective inline unit IUs, Iu may be provided in each and every RF port path P1, P2, . . . , PN (collectively referred to herein as port Pn) and/or common/antenna port AP, of the active multiplexer AM. For example, for coupling/switching the respective RF signal thereby to or from a respective transceiver TR to the frequency detection unit FD, to the network analyzer unit NA, and to a respective one of the internal RF paths I1, I2, . . . , IN (collectively referred to herein as internal RF paths In) and common port OU. The frequency detection unit FD can be connected to all of the inline units IUs/Iu of the active multiplexer AM, to thereby enable signal frequency detection of each port in the unit. The frequency detection unit FD is configured to generate the information/ parameters needed for adjusting RF paths frequencies of the tunable multiplexer TM.

In some embodiments, the network analyzer NA is configured to use the inline units IUs and Iu at the RF ports Pn and the common/antenna port AP to check the frequency response of the tunable multiplexer TM and the external ports' (Pn, AP) reflection coefficient such as impedance, return loss, and suchlike. For example, the network analyzer NA can be configured to generate the full S-parameters, delay, phase etc., and its main purpose in the active multiplexer AM is to check if the frequency response of each RF path Pn to the common/antenna port AP is properly tuned.

A portion of the described inline units, IU's and Iu, can be used as a section of a commercial network analyzer NA. Hence, the network analyzer NA abilities of the active multiplexer AM, as illustrated in FIGS. 4A to 4C comprise the network analyzer NA block together with the inline unit IU's and Iu blocks.

Additionally or alternatively, the frequency detector FD unit may be a part of the network analyzer NA circuits.

Figure 5:
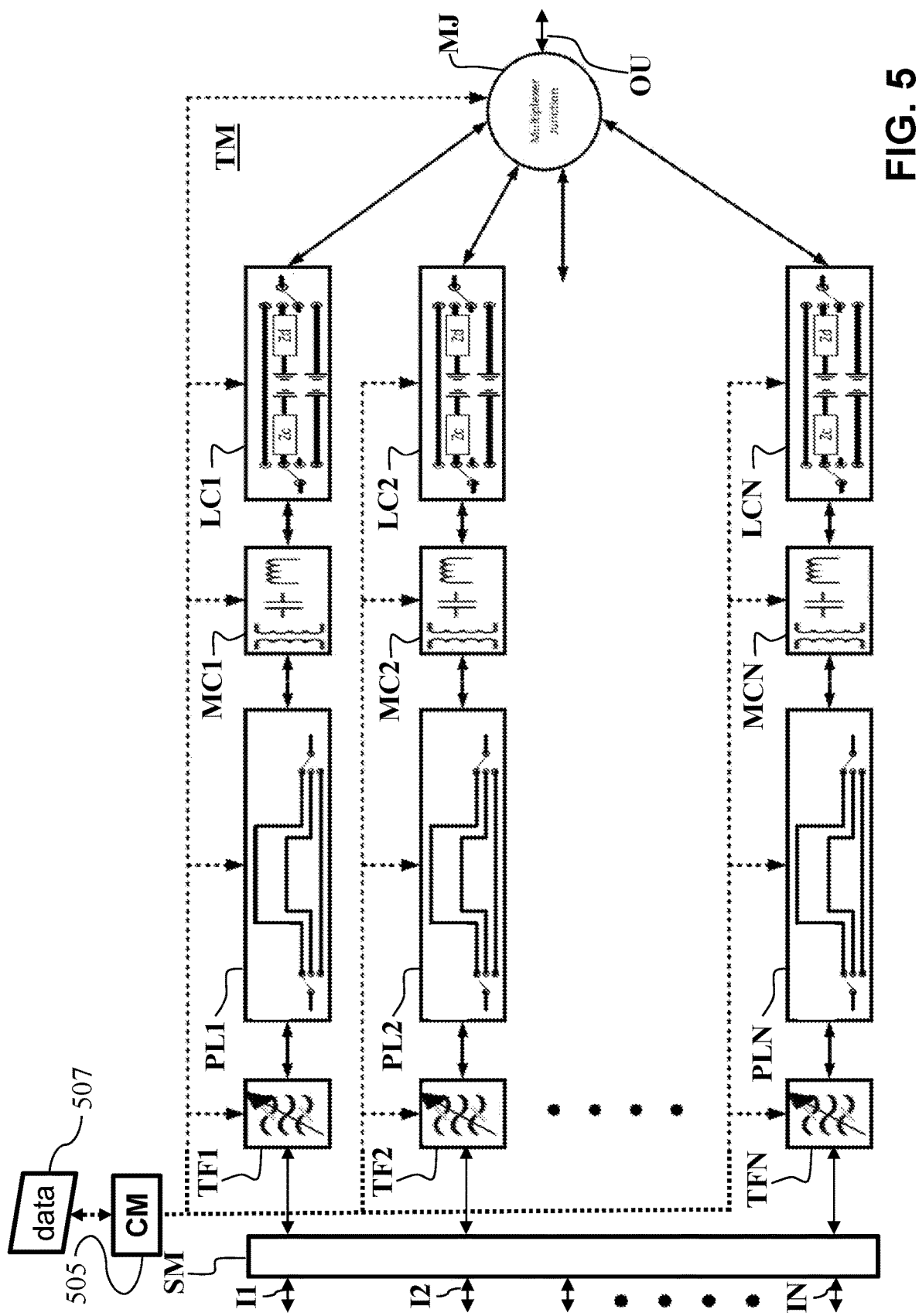
FIG. 5 is a block diagram schematically illustrating a tunable multiplexer according to some possible embodiments.

FIG. 5 shows a tunable multiplexer TM according to some possible embodiments. In some embodiments, the tunable multiplexer TM comprises a control management module CM, 505 for example the management module database Additionally, CM may exchange data 507 with a frequency detector and/or a network analyzer and/or other detection units and/or data sources). Optionally, the tunable multiplexer TM includes a switching matrix SM (e.g., implemented by an array of electric or electromechanical RF switches and/or RF splitters/combiners), a plurality of tunable filters TF1, TF2, . . . , TFN (collectively referred to herein as tunable filter TFn), a respective plurality of tunable RF propagation length modules, PL1, PL2, . . . , PLN (collectively referred to herein as tunable cable length module PLn), a respective plurality of line cut switch units LC1, LC2, . . . , LCN (collectively referred to herein as line cut switch LCn), and/or an optional respective plurality of tunable matching circuits, MC1, MC2, . . . , MCN (collectively referred to herein as tunable matching circuit MCn).

The tunable filters TFn may be implemented, for example, by pass-band filters, notch filters, low-pass filters or high-pass filters, and/or any combination thereof.

In some embodiments, filters having the right frequency response may be provided. The filters may be built using lumped elements such like LC elements i.e., inductive-capacitive elements, cavity elements such as cavity combline or interdigital structures or suchlike, on boards filtering elements using different board techniques such as microstrip, coplanar, stripline, internal coaxial structure etc., distributed cavity resonators that might be connected with cables or manufactured in the same block in which the connection is implemented through the block itself e.g., waveguide connection or iris etc., saw elements, ceramic resonance elements, and suchlike, or any other suitable technology. In order to tune the filter, switches and pin diodes can be used to switch between, paths, resonance elements, capacitors and inductors, waveguides etc. Additionally, or alternatively, varactors, piezo actuator, ferrites, servo motors, motors e.g., step motor, electromechanically switches, pistons etc. can be similarly used.

In some embodiments, the RF signal propagation length to the multiplexer junction MJ of the TM may be configured to be tuned during operation. For example, each tunable filter TFn may present a maximal impedance to all of the tunable filters, or any other needed defined impedance therein, in its operation frequency. For example, it may be advantageous to change the RF propagation length. Optionally, the change may be caned out using tunable RF propagation length modules PLn and/or by tunable phase shifter (not shown) and the tunable matching circuits MCN.

In some embodiments, a tunable RF propagation length module PLn may include an analog and/or a digital unit, based on mechanically moving elements and/or on switching between different RF length structures (e.g., delay lines). These structures may be implemented, for example, by RF cables, RF paths on boards (microstrip, coplanar etc.) and/or any other suitable alternative RF waveguiding elements. In possible embodiments, tunable RF propagation length modules PLn are implemented utilizing tunable phase shifters, instead of and/or in addition to, the tunable delay lines. Optionally, a tunable matching circuit MCn may be implemented using transformers, coils, capacitors, switches pin diodes varactors etc., for example, in order to match the impedances.

In some embodiments, a line cut switch LCn may be used to enable testing and/or tuning and/or calibrating a single RF path Pn without the interactions with other filter path impedances. It may consist of two switches, that might made of mechanical switches as well, PIN switches MEMS switches, or suchlike. In one position, for example, the switches are connected together enabling a direct path, in other option each of the switches may connect the line to ground short, cut off (high impedance) or load, e.g., 50 ohm regular load, or 50 ohm power load which should be used once a high power RF signal from the RF ports needed to be terminated. A line cut switch LCn can be added on a single or multiple locations along the tunable paths, in any order and/or may not used therein at all.

In some embodiments, the tunable filters TFN passband frequency order may be of importance. Optionally, a switch matrix module SM may be used, for example to control the order. For example, the switch matrix module SM may switch the bidirectional random pass band frequency sequence of the input/output signals fed over the internal RF paths In into an ordered frequency sequence e.g., from low frequency to high frequency, or any other suitable order, before the connection to the tunable filters section TFn.

In possible embodiments, a different order of the tunable filters TFn, of the tunable RF propagation length module PLn, and of the tunable matching circuits MCn, and/or of the line cut switch LCn, in each, or in all, of the paths/rows, may be implemented. Additionally or alternatively, several tunable filters TFn, and/or tunable RF propagation length modules PLn, and/or the tunable matching circuits MCn, and/or of the line cut switches LCn, are used in one or more paths/rows. Some of the elements may be in different order and/or the same order and/or may not be used at all.

Figure 8:
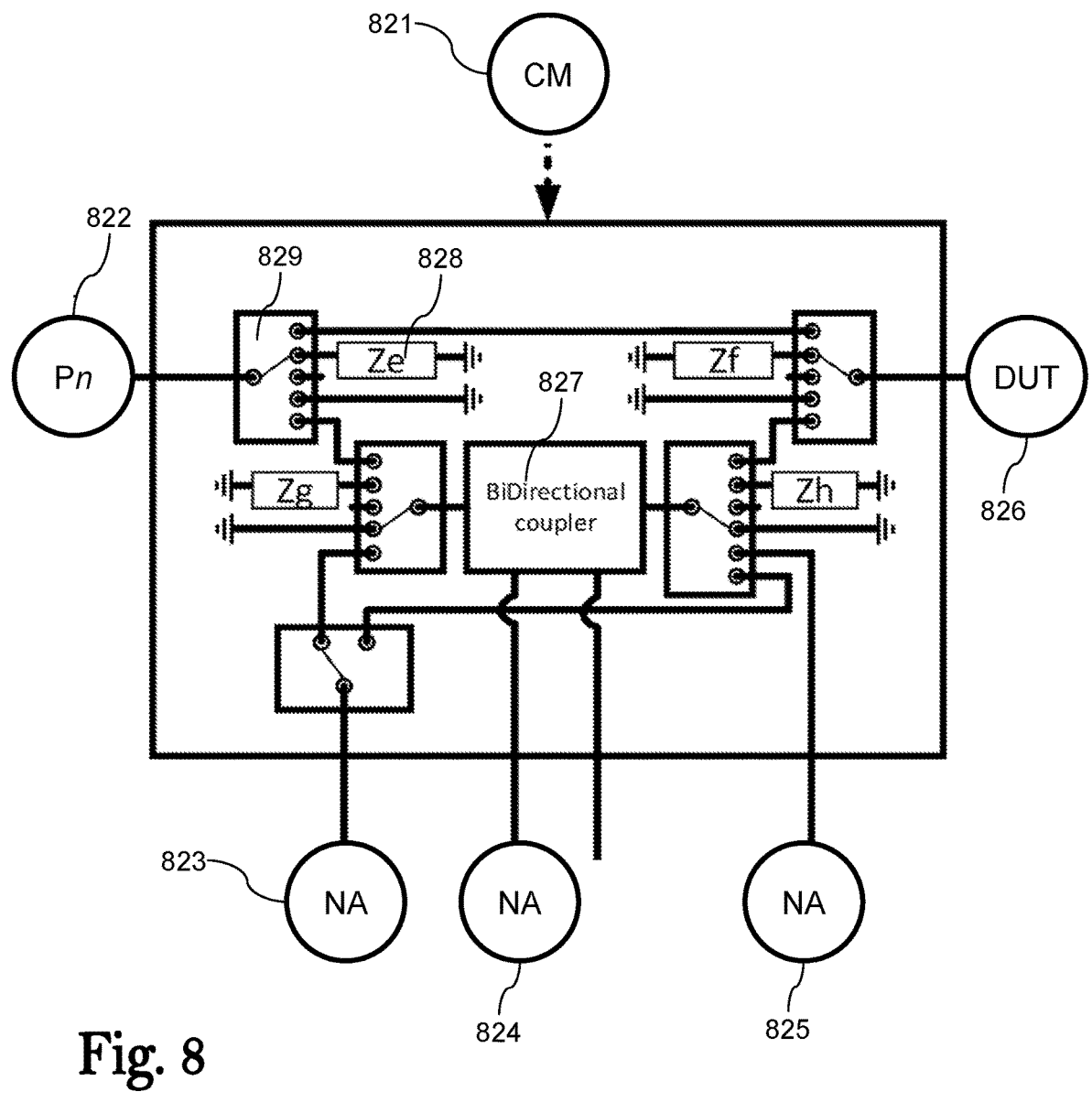
FIG. 8 is a block diagram schematically illustrating an inline unit according to some possible embodiments.

An embodiment of connection to the inline units, IU's and Iu, by the control and management lines, as well as secondary RF signal lines (shown in FIGS. 4A to 4C), are schematically illustrated. Enabling major connection are shown between the units, there may be substantially more physical wiring or wave guide connecting elements than is illustrated in the drawing. A possible basic structure of the inline units, IUs and Iu, is shown in FIG. 8. The inline unit IU/Iu comprises, in some embodiments, different switches 829 with various quantities, and/or as couplers, bidirectional couplers, splitter, combiners etc. The elements of the inline units may be connected as a sub levels switch e.g., a switching of switching switches etc.

In some embodiments, a command module CM 821 may send and/or receive control signal for example to switches of the IU. In some embodiments, the inline unit IU will connect to one or antennas and/or ports Pn 822. Optionally, the inline unit IU may be connected to one or more network analyzers NA 823, for example, including a signal source, a NA 824 for backward and/or forward signal connecting to the bidirectional coupler 827, and/or the connection may be through a switch matrix TSM (for example in the network analyzer NA 825)). Alternatively or additionally, the IU may be connected to a device under testing (DUT 826). For example, the DUT 826 may include a tunable multiplexer TM. For example, the IU may be connected to a connector and/or an inline unit IU and/or a common port OU of the device under testing DUT.

In some embodiments, the inline unit enables may performing one or more of the following:

Connecting the main line ports directly.

Terminate main line ports into defined load 828 (Impedance) Ze, Zf, Zg, Zh, ground short (zero impedance), or cut off (infinite impedance), to enable calibrating the network analyzer NA, and enable tuning calibration.

Coupling the RF signal on the line for frequency detection including RF signal power.

Couplings the RF signal on the line to the network analyzer NA circuitry, and using the main line signal, or using addition signal source from the network analyzer NA circuitry for providing network analyzer NA ability to perform Full S-parameters measurements of the device under test (DUT) i.e., the tunable multiplexer TM. The ability to use the main signal line as the source for the network analyzer NA abilities, enable performing S-parameters tests, without disconnecting the filter channel for maintenance purpose.

Enabling examination of for example, reflection coefficient properties such as return loss and/or impedance of the RF ports and/or of the antenna/common port.

In some embodiments, the through switch matrix TSM line enables connection to the through switch matrix module which is provided in some embodiments within the network analyzer NA block. The through switch matrix TSM optionally enables through calibration, for example in order to perform full 5-parameters calibration of the network analyzer NA for any or all paths. Some functionalities of the units and modules disclosed herein can be carried out utilizing techniques described in the patent publications indicated hereinabove, the disclosure of which is incorporated herein by reference.

Figure 9:
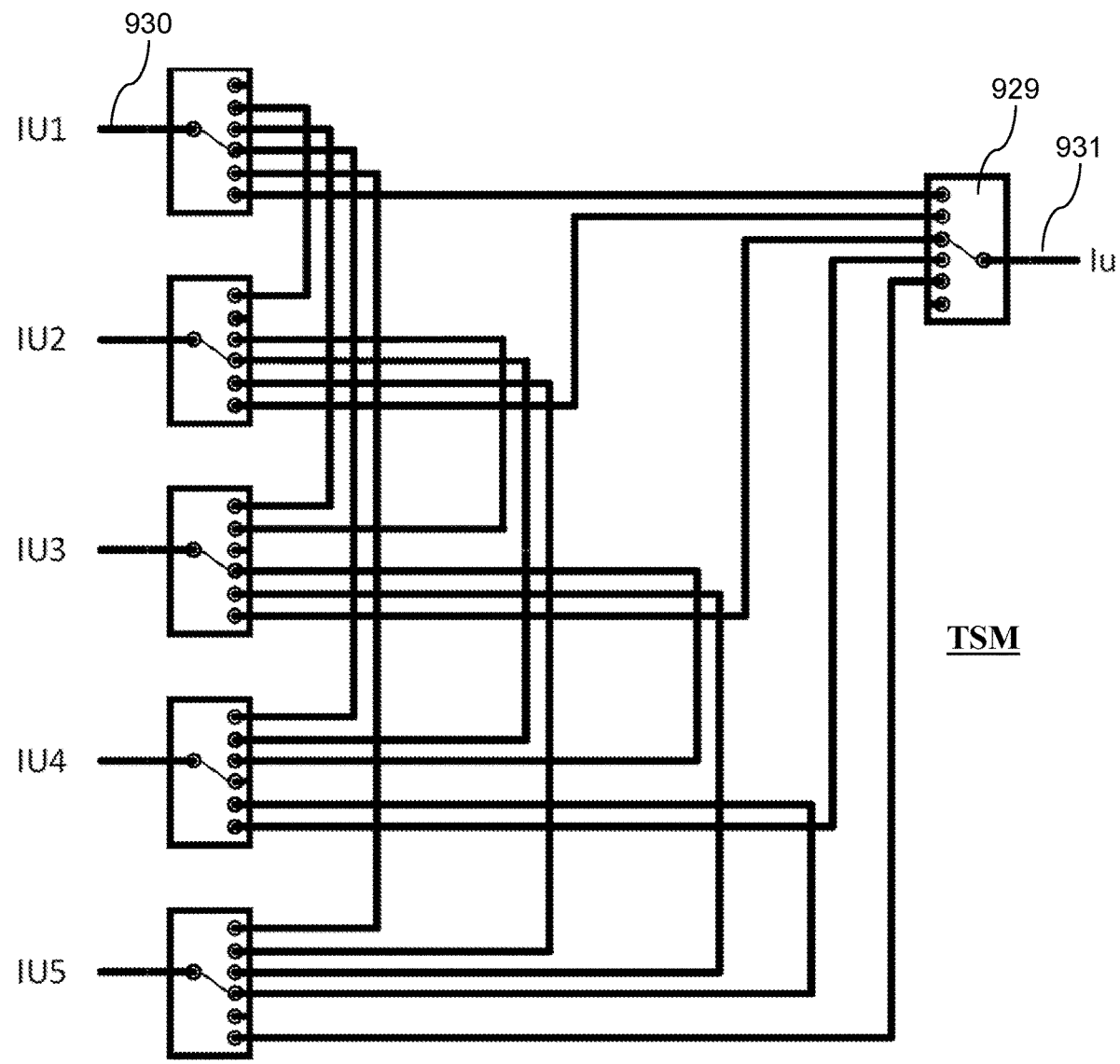
FIG. 9 is a block diagram schematically illustrating a through switch matrix according to some possible embodiments.

FIG. 9 shows a non-limiting example of a through switch matrix TSM of the active multiplexer AM, having five (5) RF ports 930 and one common/antenna port. The through switch matrix TSM is optionally connected to all inline units, IU's and Iu, of the active multiplexer AM. The through switch matrix TSM is optionally controlled by the control module CM, for example, for enabling performing the network analyzer NA "through" calibration prosses by connecting a direct path among all inline units, IU's and Iu. The through switch matrix TSM comprises for example N+1 switches 929. Optionally, each switch 929 has N positions or more. Additionally or alternatively, the switches 929 might be connected through several switches etc., being mechanical electrical e.g., PIN diode or FETs, MEMS etc. The through switch matrix TSM is optionally configured to enable calibration of the network analyzer NA, for example, in order to check the full S-parameters measurements of each inline unit, IU to the Iu, and/or a full S-parameters measurements between each inline unit IU to each other inline unit IU, which enables the critical information of isolation between the RF ports Pn.

Figure 10A:
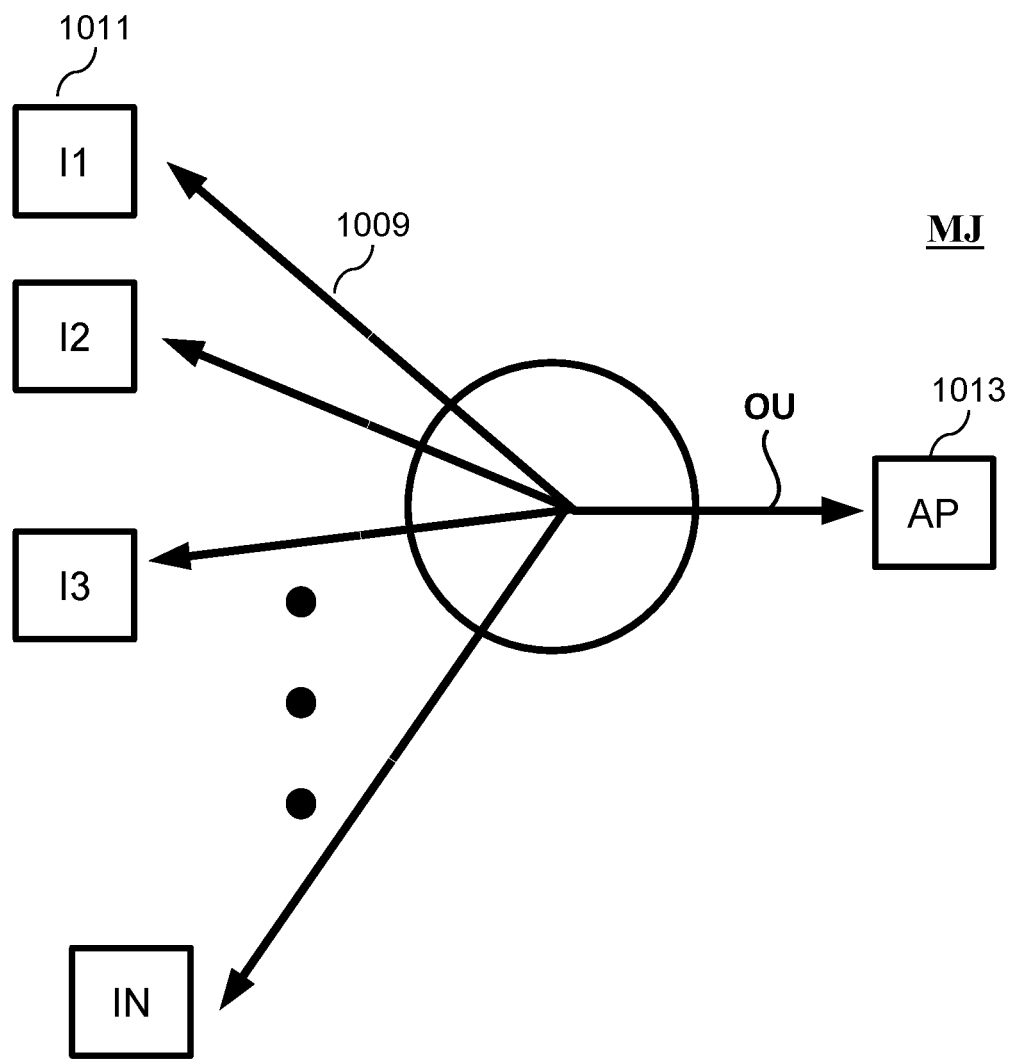
FIGS. 10A to 10G are block diagrams schematically illustrating implementations of the multiplexer junction according to some possible embodiments.

In some embodiments, a multiplexer junction MJ may implement connection between some or all of the tunable filters TFn to a common/antenna port OU. The multiplexer junction MJ may be realized in several different ways, as exemplified, for example, in FIGS. 10A to 10F. In some embodiments, the basic connection is the star junction technique, for example as illustrated in FIG. 10A. Optionally, the electrical length 1009 from the tunable multiplexer TM paths/channels (e.g., ports Pn 1011) and/or tunable filters TFn to the multiplexer junction MJ and/or the common port OU may be varied using a tunable propagation unit (e.g., as shown in FIG. 5) and/or phase shifters (not shown). The tunable propagation unit may perform odd multiples of quarter wavelength at the mean of various system frequencies or any other needed length that can achieve reduced interruption between the filters e.g., reduced insertion loss between the RF ports Pn to the common/antenna port AP 1013 at their pass band frequencies. Optionally, the common port OU may be connected to an antenna port AP and or an antenna and/or and inline unit Iu.

Figure 10B:
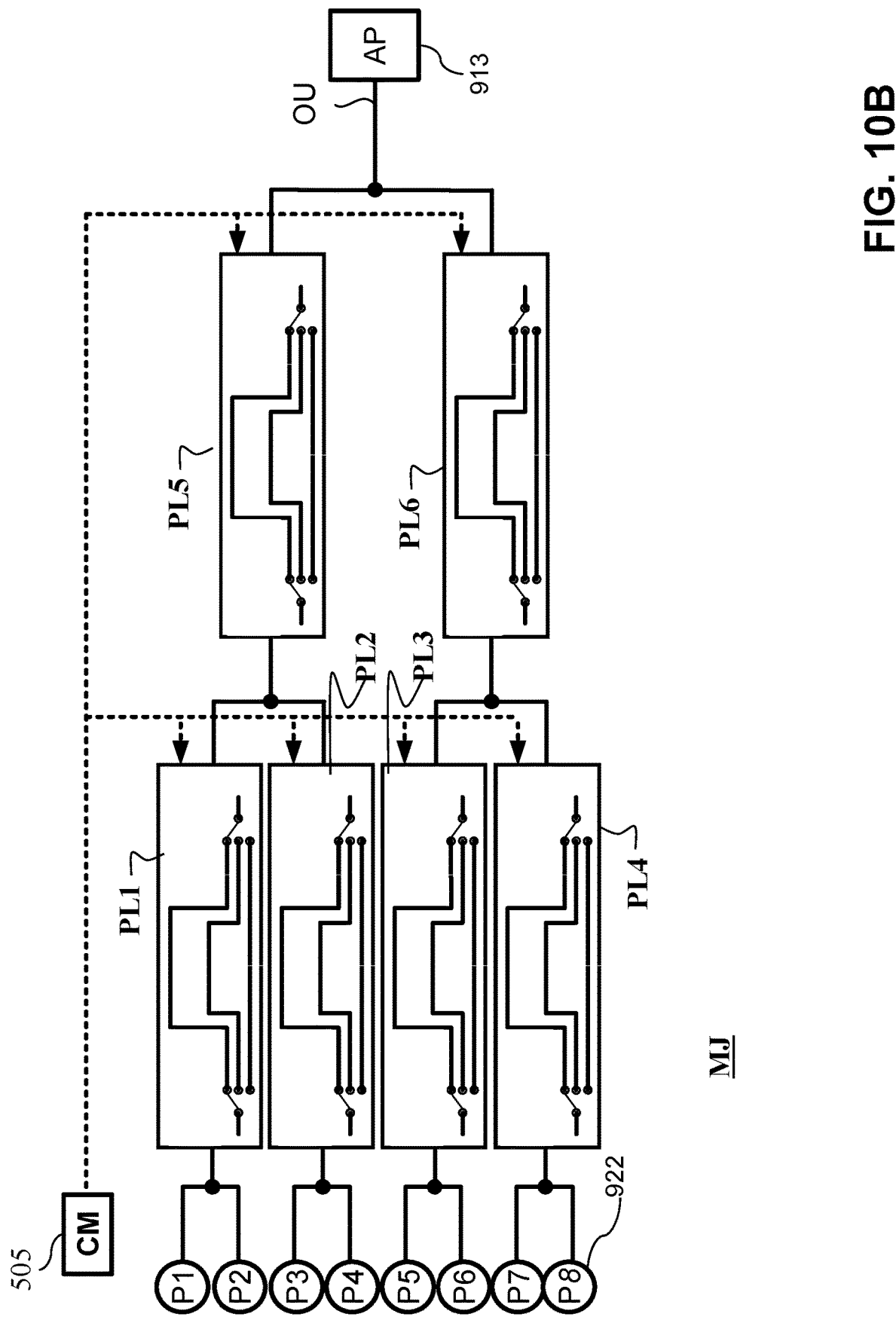

A possible technique is multiple wavelength transformers to common antenna junction, exemplified in FIG. 10B. In this specific and non-limiting example, tunable propagation lines PLn and/or tunable phase shifter (not shown), can be use, as shown in FIG. 10B to create in the first junction level, electrically length of an odd multiple of quarter wavelength, at mean of all system frequencies. Second and third level electrically length should then be tuned to half wavelength at mean of all system frequencies, or any other needed length that can achieve minimum interruption between the filters e.g., reduced insertion loss between the RF ports Pn 922 to the common/antenna port AP 913, at their pass band frequencies. For example, common/antenna port AP 913 may include an inline unit Iu. Optionally a command module 505 controls the tunable elements of the multiplier junction MJ.

Figure 10C:
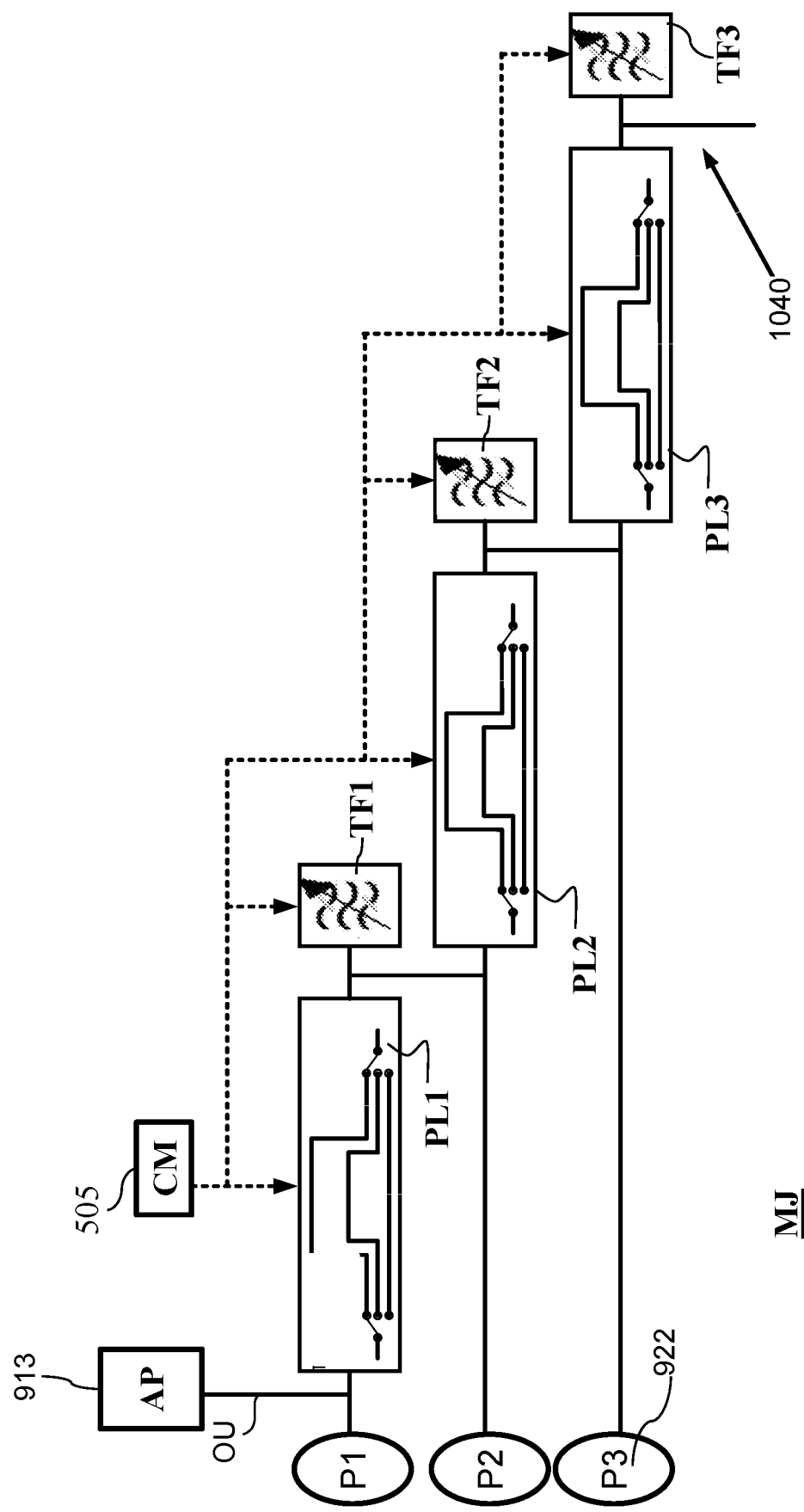

In a possible technique, an expandable system, for example disclosed in U.S. Pat. No. 3,124,768, the disclosure of which is incorporated herein by reference, and exemplified in FIG. 10C. In this specific and non-limiting example, tunable propagation lines PLn and/or tunable phase shifters (not shown), can be used as shown in FIG. 10C, in addition to the tunable filters TFn, for example a tunable notch filters shown in FIG. 10C. Here, the tunable propagation lines PLn shown in FIG. 5, and/or phase shifters (not shown), may be adjusted according to the aforementioned simple star junction technique and/or the tunable propagation lines PLn, and/or phase shifters, appearing in FIG. 10C are tuned to odd multiples of quarter wavelength of their adjacent notch filter (the filter that is within the same row), the tunable notch filter is tuned to reject the same frequency appearing in the same line connection achieving isolation between the different rows, which are the tunable multiplexer TM different paths/channels, or any other needed length that achieve reduced interruption between the filters e.g., reduced insertion loss between the RF ports Pn to the common/antenna port AP at their pass band frequencies (e.g., P1 including a first pass band, P2 including a second pass band, P3 including a third pass band). For example, the multiplexer TM may separate and/or combine pass band signals of different ports Pn. The line connector cable 1040 of the last section may optionally not be applied to a port.

Figure 10D:
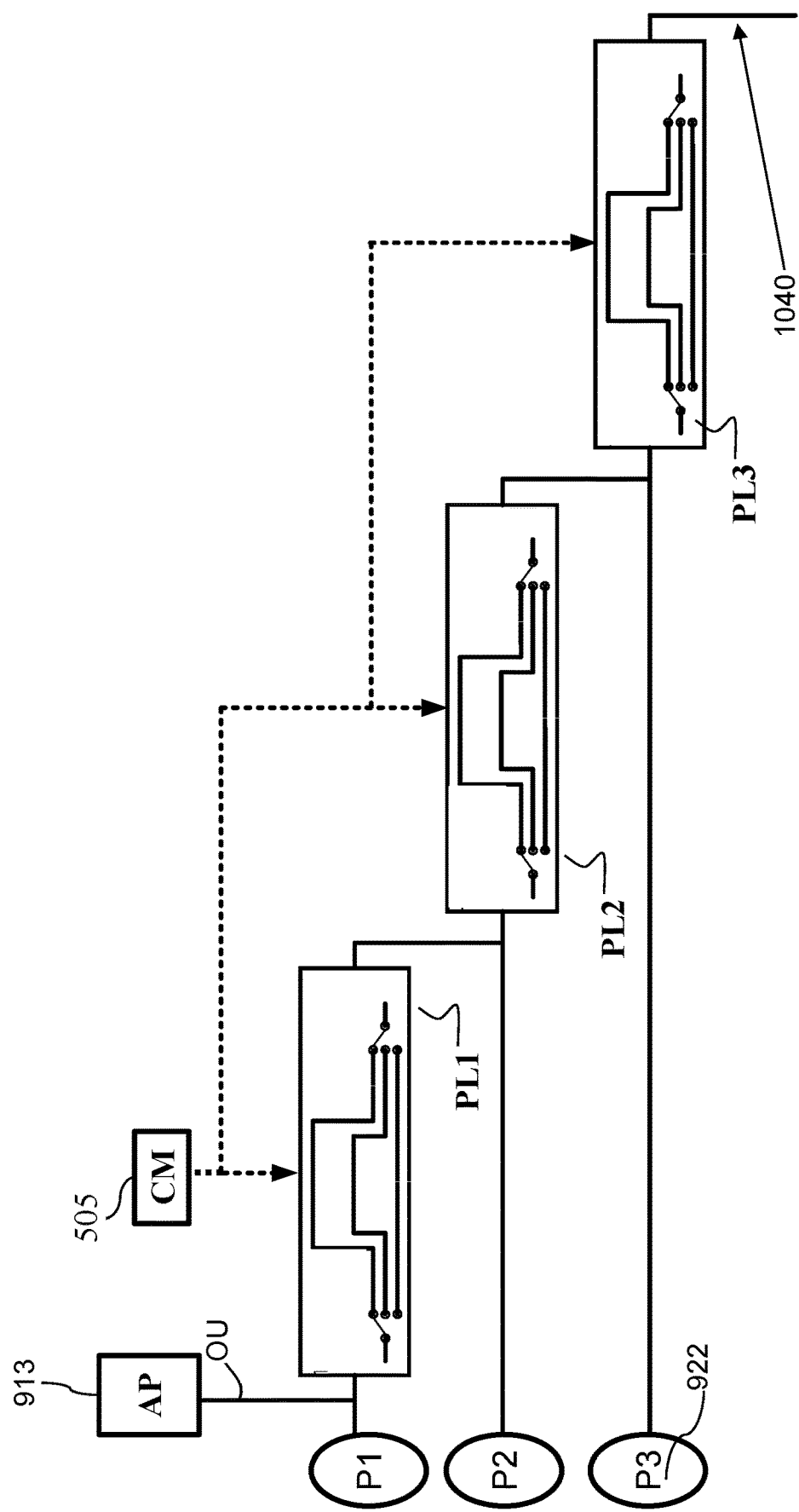

In some embodiments, a parallel bridging with "T Tapped" antenna throwline is used, as exemplified in FIG. 10D. In this specific and non-limiting example, tunable propagation lines PLn, or tunable phase shifters (not shown), can be use as shown FIG. 10D. Here, the tunable propagation line PLn shown for example in FIG. 5, and/or phase shifter (not shown), are adjusted (e.g., according to the aforementioned simple star junction technique), and/or the tunable propagation lines PLn, and/or phase shifters, shown in FIG. 10D are tuned so that for each channel that is connected to the multiplexer junction MJ, a high impedance will appear at frequencies f1 to f4 according to the junction number, looking down the throwline from that junction, or any other needed length that achieve reduced interruption between the filters e.g., reduced insertion loss between the RF ports Pn to the common/antenna port AP at their pass band frequencies.

Figure 10E:
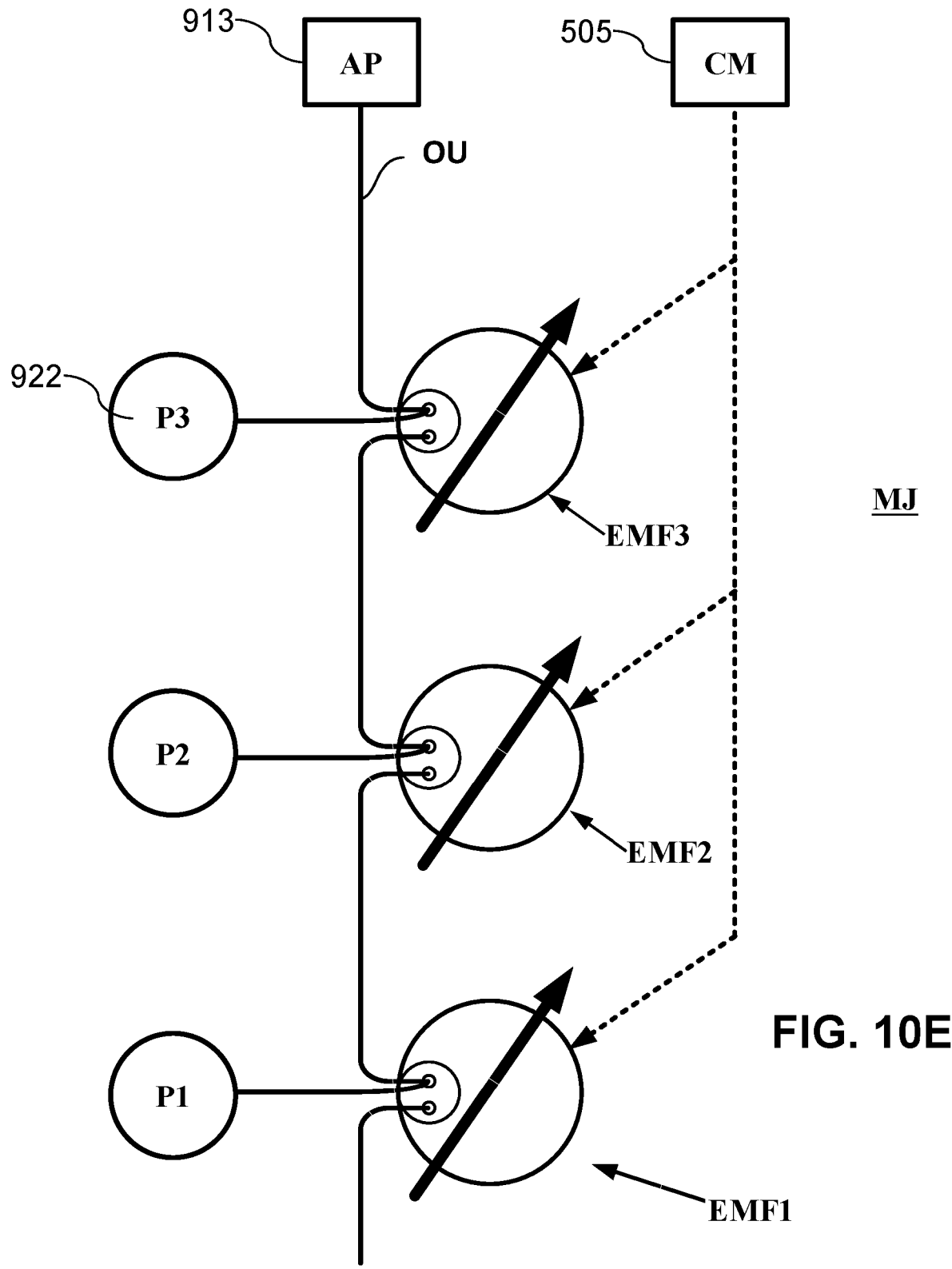
Figure 10F:
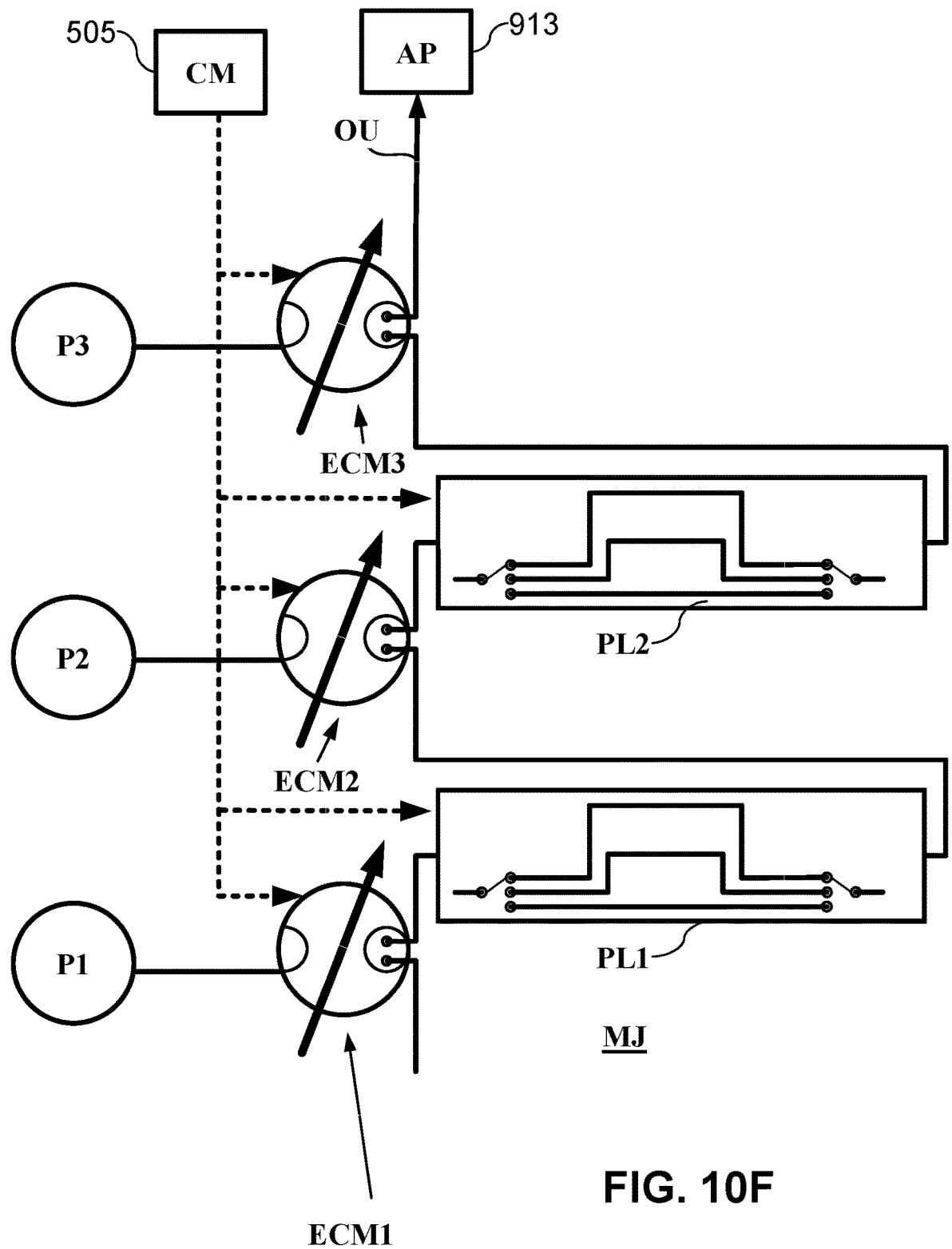

In some embodiments, for example as illustrated in FIG. 10E, expandable multiplexer filter EMFn paths/channels are used, forerunner to T-PASS, such as disclosed in U.S. Pat. No. 4,206,428, the disclosure of which is incorporated herein by reference, as exemplified in FIG. 10E. Tunable propagation lines PLn and/or tunable phase shifters (not shown), can be use in between the EMFn's, or may not. Here, we are using a resonator in which capacitor and inductor are applied according the methods disclosed in the U.S. Pat. No. 4,206,428. The tuning of this filtering element, which is band pass in one path, and of reject section in other path per frequency, could be done not manually but by a command from the control module CM 505 through all the tuning ways appearing at the tuning filter techniques, some of which are for tuning its capacitor and inductor by a servo or motor, or by using a varactor, or by switching between different capacitor or coils or any suchlike. Moreover, the resonator structure e.g., its length may be changed by mechanically changing e.g., by a servo motors, motors e.g., step motor, pistons etc. In a similar way the structure of its center probe may be changed e.g., its length.

Optionally, the expandable multiplexer filter EMFn paths/channels and/or tunable propagation lines and/or phase shifters (not shown), for example in FIG. 5 are adjusted, for example according to the aforementioned simple star junction technique, and/or any other needed length that achieve reduced interruption between the filters e.g., reduced insertion loss between the RF ports Pn to the common/antenna port AP at their pass band frequencies. For example, EMF1 may connect a first pass band to port P1. For example, EMF2 may connect a second pass band to port P2. For example, EMF3 may connect a third pass band to port P3.

In some embodiments, T-pass Expandable Cavity Multicoupler ECMn are used, for example as disclosed in U.S. Pat. No. 4,249,147, the disclosure of which is incorporated herein by reference, as exemplified in FIG. 10F. Tunable propagation lines PLn and/or tunable phase shifters (not shown), can be use as shown in the FIG. 10F. The filtering elements, T-pass cavities made, for example, of a resonator, in which capacitor is installed on the throwline connectors for example according to the method disclosed in U.S. Pat. No. 4,249,147. Electrical tuning of this filtering element, which is band pass in one path and of reject section in other section, may be done for example not manually but by a command from the control module CM 505 through all the tuning ways appearing at the tuning filter techniques appear up to here, some of them are tuning its capacitor by a servo or motor, or by using a varactor, or by switching between different capacitor etc. Moreover, the resonator structure e.g., its length may be changed by electro-mechanical changes e.g., servo motors, motors e.g., step motor, pistons etc. in a similar way the structure of its centre probe may be changed e.g., its length.

Here, the tunable propagation lines PLn, and/or phase shifters (not shown), are tuned according to the frequency scheme, for example:

Tunable propagation line PL1=odd multiple of quatre wavelength of f1, tunable propagation lines PL1+PL2=odd multiple of quatre wavelength of f2, alternatively or additionally there may be more paths/channels and/or tunable propagation lines L1+L2+L3=odd multiple of quatre wavelength of f3, L1+L2+L3+L4=odd multiple of quatre wavelength of f4, or any other needed length that achieve reduced interruption between the filters e.g., reduced insertion loss between the RF ports Pn to the common/antenna ports AP 913 at their pass band frequencies.

In some embodiments, a fixed propagation line or fixed phase shifter may be used instead of tunable propagation lines and/or phase shifters. For example, in situations in which the tunable propagation lines and or phase shifters are not needed The multiplexer junction MJ and all of its components may be used as separate parts, or all manufactured in the same block with the same manufacturing techniques, for example, as described in international patent publication No. WO 2020/115752, of the applicant hereof, the disclosure of which is incorporated herein by reference.

Figure 10G:
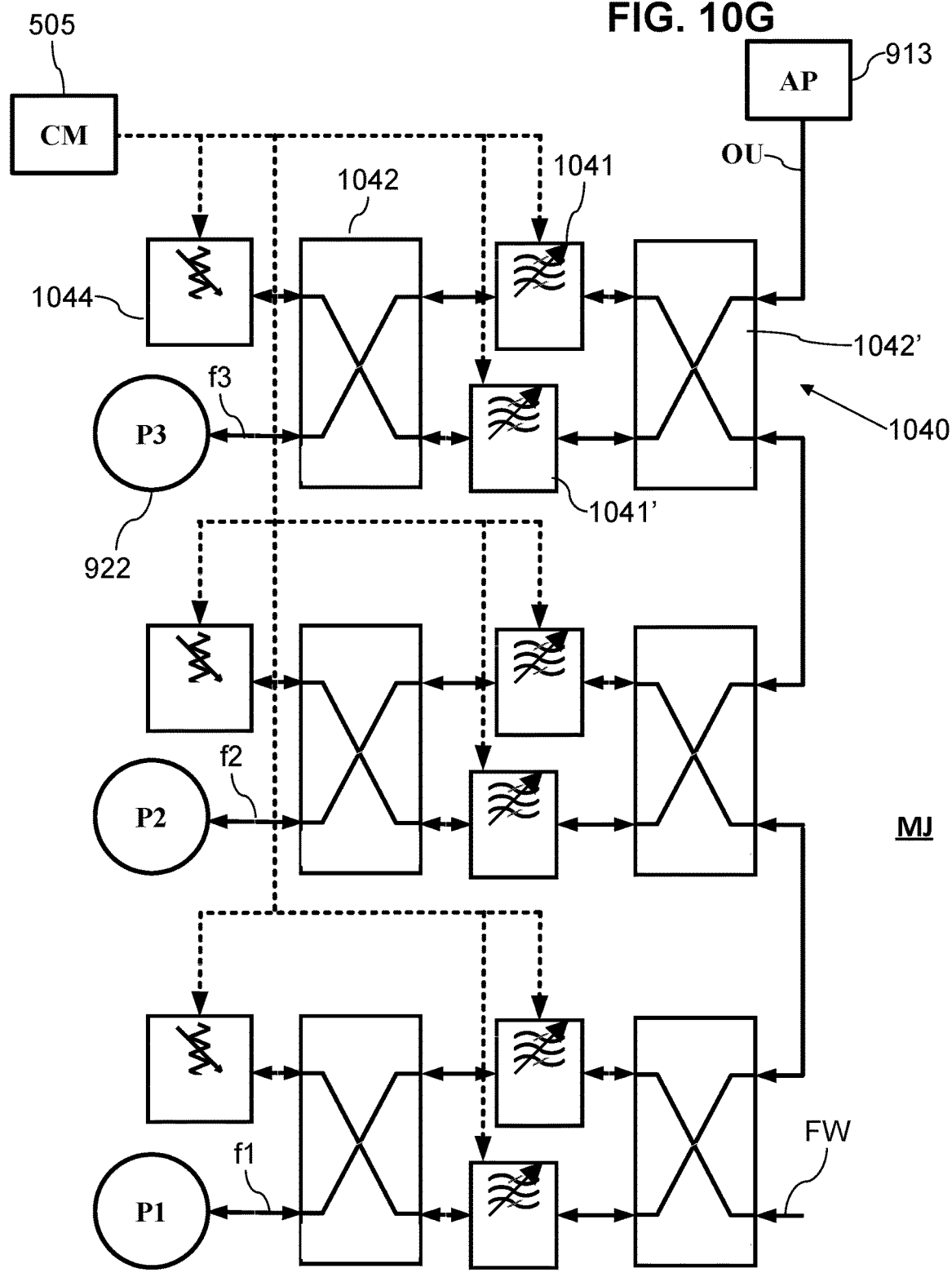

FIG. 10G illustrates an embodiment of a balanced tunable multiplexer junction in accordance with an embodiment of the current invention. In some embodiments, a signal path/channel 1040 of a balanced multiplexer junction may include of a balanced pair of tunable bandpass filters 1041, 1041', two couplers 1042, 1042' (e.g., 3 dB couplers and/or hybrid couplers e.g. 90 degree hybrid coupler) and/or a tunable balancing load 1044. The Pass Band at the multiplexer port (e.g., f1, f2 and f3 at ports P1, P2 and P3 respectively) corresponds to the filter resonant frequency, whereas the wideband input FW is all other Pass Band frequencies. Optionally, the wideband input signal loss is very low because it does not pass through the bandpass filters. In some embodiments, the modules may be cascaded to form a multichannel combiner. It should be noted that the multiplexer junction MJ could be constructed utilizing a portion, and/or mixture of the embodiments described hereinabove.

The present application further provides a method for using or calibrating the tunable multiplexer for various frequencies of operation and temperatures. One method of calibrating the active multiplexer AM is by using automatic test equipment (ATE), in which a network analyzer could be integrated, and a computer device (e.g., personal computer—PC), or any other suitable logic processor. In this method the computer device sends a command to the control module CM to set the inline units', IUs and Iu, into a state that connect each tunable filter individually. In this state, in order to isolate only one RF channel for its measurements, the line cut switch unit LCn of all the other channels cut their path to the multiplexer junction MJ. Once a certain tunable filter is connected individually to the network analyzer of the ATE, the filter tuning parameters are tuned in order to achieve a certain pass band frequency, with the certain band width, with the needed isolation to other frequencies, with the needed return loss, the needed phase delay, the needed ripple etc.

For this approach, several known techniques can be used. Once the electrical needed parameters achieved, the tuning parameters are recorded to the ATE and/or to the control module CM. The process is repeated, to a different passband frequency according to a pre-defined frequency values up to the stage in which tunable values for each frequency, are recorded. Then a temperature sweep may be done. For getting tuning values for different temperatures values within a predefined temperature range, the environmental temperature is changed and all the procedure is carried out again, in order to have all the needed tunable parameters, for all the needed frequencies and all the needed temperature.

Once this procedure for the first tunable filter is completed, the next tunable filter is connected through the inline units, IUs and Iu, and the full procedure is performed again up to a stage in which all the needed control tunable values that may set each tunable filter for each frequency in a certain temperature are recorded. The order of the stages of this procedure may be changed, some or all of these stages may be multiplied or neglected if needed.

Once all the tunable filters "stand alone" tunable parameters are known, the line cut switch LCn connects them to the multiplexer junction MJ to establish the operational multiplexer device. At this stage, a procedure for tuning the mutual impact between the tunable filters is executed. In one embodiment, the values of the tunable propagation line, or tunable phase shifter, the tunable matching circuit, and the tunable values of the components within the multiplexer junction MJ—all of them in the tunable multiplexer TM, are set (for example using known techniques according to prior art) with the target to achieve maximum electrical performances, for example reducing impact between the channels and/or best filter return loss over the frequency(s) of interest and/or minimum insertion loss etc., that could be done by utilizing the network analyzer NA previously obtained measurements data of the electrical performances of the tunable filters obtained. This setting is applied for each single frequency and temperature as needed. Then, small adjustments may be caned out randomly, or in a predefined order, to the tunable variables in order to achieve maximum electrical performances. These values are recorded to the ATE and/or to the control module CM. One possible method to make this measurement, is to set the first filter to f1, the second filter to f2 etc. up to the N filter and the fN frequency, performing the measurement, calibrating and recording, and then changing the tuning band of all the tunable filters in one frequency state except of the first one i.e., the second filter to f3 up to the N filter to fN+1 and so on. In a similar way, a full matrix of conditions should be measured, calibrated and recorded for all passband frequencies values that exist in all N tunable filters and all combinations among them. If needed, changes can be done also within the tunable filter in order to achieve optimized performances.

In some embodiments, the multiplexer may be completely tuned all together and the tunable filters, RF propagation length, the matching circuits and the multiplexer junction MJ may be tuned in-place starting with initial conditions. The computer device of the ATE may be used to create nominal tuning values (determined from design and updated with actual factory data). This way the active multiplexer AM may be optimized for best insertion loss, isolation, return loss, or other electrical properties. Here, all of the tuning values exist in the active multiplexer AM are optimization variables.

There may be situations in which reduction in the calibration and tuning database records are desirable, and/or that generation of tuning values for certain conditions are not directly set. In such situations, in the research and development (R&D) stage, a formulation for the behavior of the tunable parameters should be executed by measurement, this formulation should be recorded within the control module CM. During the production phase, in particular during tuning and measurements procedure, several conditions should be set e.g., certain frequencies or other, the tunable values of these conditions should be internally evaluated by the formulation recorded within the control module CM and set to the tunable components, then by measurements the formulation can be checked, approved or corrected.

Some embodiments of this disclosure enable a self-calibration method in a manner that instead of the computer device of the ATE, the control module CM is used, and instead of the network analyzer of the ATE, the network analyzer NA of the active multiplexer is used. A self-calibration method saves the ATE costs, and the manufacturing time, and finally reduces product cost and time to market.

In some embodiments, for the tuning self-calibration ability, the internal network analyzer NA should be calibrated as well. For this purpose, the mentioned calibration switches within the inline units, IUs and Iu, and the through switch matrix TSM are used. Network calibration methods are well-known in the art, and will not be described herein in details for the sake of brevity.

The methods disclosed herein may be broadly viewed or categorized into one of two primary modes: a predefined mode; and an adapt mode. In the predefined mode, commands that are sent to the tuning elements are fixed at the time of manufacture (hence predefined), or whenever the calibration of the multiplexer is performed to compensate the changes over frequency, temperature or other. Using the internal network analyzer NA, this could be done anywhere anytime as long as the power to the unit is on. In adapt mode, the system can start with the predefined tuning state or the last known state, and can then adjust the tunable parameters to compensate for unanticipated loading effects at the antenna, or at the transceivers of the RF ports, or for different multiplexer spacing than were accounted for during calibration, or any other situations that might cause for unpredicted electrical performances values.

The control management and database module CM is the brain of the tunable multiplexer TM. The control management and database module CM can be implemented by one or more processors and memories (not shown) configured and operable to perform the following:

Operate the frequency detector unit FD and receive from it the operation frequencies detected for the RF ports PN of the connected Transceivers N, and/or at the antenna port AP.

Adjust the tunable elements (TFn, PLn, MCn, LCn, MJ) in accordance with the frequencies of operation detected for the Transceivers N and/or the antenna port AP, utilizing a predetermined formulation scheme and database e.g., determined during development and/or manufacturing. It is noted that in possible embodiments each of the tunable elements (TFn, PLn, MCn, LCn, MJ) can be configured to change the response of one or more other paths/rows. Hence, for example, changing the pass band frequency of the first tunable filter TF1, may impact the losses of the other tunable filters. In this case, for optimal operation, the other tunable filters may be tuned as well, although no change happen with their pass band frequency. These tuning values of the mutual influence between all elements should be learned during development and/or production, and should be set for each active multiplexer AM as a formulation and/or a database.

Due to a large number of tunable variables, and other external changes, such as temperature etc., there is a need to rapidly evaluate the frequency response of the AM. For this purpose, the control management and database module CM can be configured to receive from the network analyzer module NA the frequency response of each RF path (full S parameters—$S_{Ij,OU}$, $S_{OU,Ij}$, $S_{Ij,Ij}$, $S_{OU,OU}$, $S_{Ij,Ik}$ (where $1 \leq j, k \leq N$ are integer numbers). This information together with the mutual influence formulation and database, enables the correction of any drifts in the active multiplexer AM.

The control module CM may consider the ambient temperature during its tuning and calibration process in order to decrease tuning errors according to the database and formulation in which the temperature values are predefined. For this purpose, the control module CM may use an internal temperature sensor(s).

The control module CM may be the central processing component for network analyzer calibration NA, and/or the central processing component for the tuning calibration, in order to eliminate the need of the ATE.

In some embodiments, in order to perform frequency response measurements, tuning and calibration, the control module CM can be configured to instruct the inline units, IU and Iu, to change their mode from coupling of the RF signal and/or directly passing it via its main path etc. into a position in which the tunable multiplexer TM is connected to the network analyzer NA directly, and may cause the path to be terminated with 50 ohms to the other sides. In this state no signal flow can occur from the bidirectional port to the common port, and vice versa. It should be noted that the control module CM will set the network analyzer NA ability according to predefined algorithm, based on indication of minimum or no RF coupling power in the inline unit IU, in order to reduce the time intervals of unavailability of the path. Other option to perform measurements by the network analyzer NA without creating path unavailability can be performed without switching the tunable multiplexer TM totally to the network analyzer NA, for that purpose one may use the RF signal coming from the external ports instead of the signal generated by the network analyzer NA using the inline element IU switch position available for this option. Other channels unavailability solutions involve coupling network analyzer NA generated signal using the IU along with the RF signals passing the AM (This option is not shown if FIG. 8 and consist additional couplers and switches). Using the CM signal processing ability, one may perform the frequency response measurements, tuning and calibration.

In some possible embodiments the tuning of the tunable elements (TFn, PLn, MCn, LCn, MJ) of the tunable multiplexer TM can be carried out entirely by the network analyzer NA. In such situations the tuning/calibration database and/or formulation are not used, and can be removed from the system.

Figure 7:
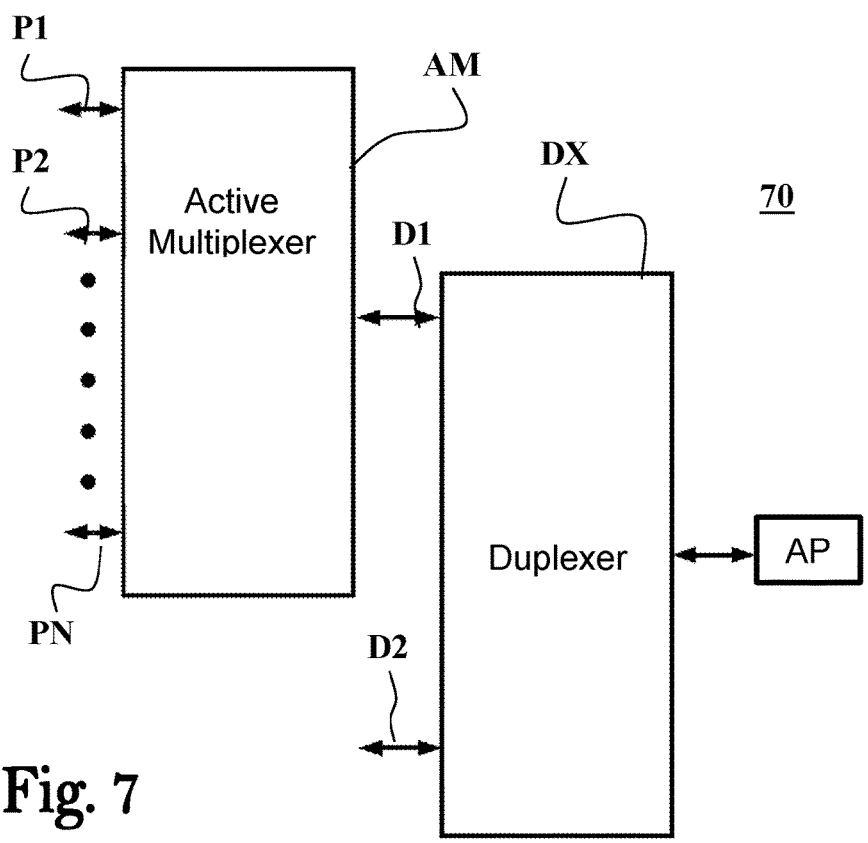
FIG. 7 is a block diagram schematically illustrating combining of signals from multiple active multiplexers having different frequency ranges.

In some embodiments, as demonstrated by the multiplexing system 70 shown in FIG. 7, an active multiplexer AM according to any of the embodiments disclosed herein is connected to a duplexer DX. It is noted that in possible embodiments the active multiplexer AM can be simply connected to another active multiplexer (AM) to achieve similar signals transmission properties. Such a system might be used when connecting multiple active multiplexers AM of the present application.

In the embodiment of FIG. 7, the active multiplexer AM is used to multiplex all the variable pass band RF ports Pn, each of which is used to pass RF signals having a sub band of the frequency band f1 to f2. The multiplexed signals of the active multiplexer AM are further multiplexed by the additional cascading duplexer DX, which combines with the multiplexed signals passing over one of its RF port D1 additional RF signals, of the frequency band f3 to f4, passing over its other RF port D2. This way, a union of the RF signals of all of the tuned sub band frequencies, f1 to f2, and f3 to f4, is communicated between the common/antenna port of the duplexer DX and the RF ports Pn and D2.

In possible embodiments wherein the multiplexing system 70 shown in FIG. 7 is needed, the multiplexing system 70 can be implemented by using an active multiplexer AM with one tunable path downgraded in a manner that the inactive path is designed to be not tunable.

It should also be understood that where a process and/or method are shown or described, the steps of the method may be performed in any order, or simultaneously, unless it is clear from the context that one step depends on another being performed first.

Functions of the system described hereinabove may be controlled through instructions executed by a computer-based control system which may be housed in the control module CM. A control system suitable for use with embodiments described hereinabove may include, for example, one or more processors connected to a communication bus, one or more volatile memories (e.g., random access memory—RAM) or non-volatile memories (e.g., Flash memory). A secondary memory (e.g., a hard disk drive, a removable storage drive, and/or removable memory chip such as an EPROM, PROM or Flash memory) may be used for storing data, computer programs or other instructions, to be loaded into the computer system.

Aspects of the present application may be implemented as a system, method, or computer program, or a combination thereof. Accordingly, the disclosed embodiments can be implemented entirely by hardware, entirely by software (including firmware, resident software, micro-code, etc.), or by combining software and hardware means, which may generally be referred to herein as a "circuit," "module" or "system." Hardware features disclosed herein can be implemented in some embodiment by application specific integrated circuits (ASICs), or field-programmable gated arrays (FPGAs)

As described hereinabove and shown in the associated figures, the present application provides frequency multiplexing schemes usable for RF communication systems, and related methods. While particular embodiments of the invention have been described, it will be understood, however, that the invention is not limited thereto, since modifications may be made by those skilled in the art, particularly in light of the foregoing teachings. As will be appreciated by the skilled person, the invention can be carried out in a great variety of ways, employing more than one technique from those described above, all without exceeding the scope of the claims.

General Caveats

It is expected that during the life of a patent maturing from this application many relevant technologies will be developed and the scope of the terms is intended to include all such new technologies a priori.

As used herein the term "about" refers to ±5%

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween. When multiple ranges are listed for a single variable, a combination of the ranges is also included (for example the ranges from 1 to 2 and/or from 2 to 4 also includes the combined range from 1 to 4).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

What is claimed is:

1. A frequency multiplexing system comprising:
a plurality of RF ports and a single common port;
a frequency detection unit configured to detect a frequency of signals provided over at least one of said plurality of RF ports and said common port;
a tunable multiplexer comprising a respective plurality of tunable signal paths, said tunable multiplexer configured to adjust at least one of said plurality of tunable signal paths in accordance with the frequency of signals detected by the detection unit, to thereby enable signals transmission between said single common port and said plurality of RF ports.

2. The system of claim 1, wherein the plurality of tunable signal paths comprise at least one tunable filter.

3. The system of any one of the preceding claims, wherein the plurality of tunable signal paths comprise at least one tunable signal propagation length module.

4. The system of any one of claims 1 and 2, wherein the plurality of tunable signal paths comprise at least one tunable matching circuit.

5. The system of any one of claims 1 and 2, wherein at least one of the plurality of tunable signal paths comprises a pair of tunable bandpass filters.

6. The system of any one of claims 1 and 2, wherein at least one of the plurality of tunable signal paths comprises two couplers.

7. The system of claim 6, wherein each of said two couplers is a hybrid coupler.

8. The system of claim 6, further comprising a tunable balancing load.

9. The system of any one of claims 1 and 2, comprising a tunable multiplexer junction unit configured to combine the signals from the plurality of tunable signal paths.

10. The system of any one of claims 1 and 2, further comprising a network analyzer configured to check frequency response of the tunable multiplexer and a set tunable parameters thereof accordingly.

11. The system of any one of claims 1 and 2, further comprising a control unit configured and operable to change settings of at least one of the plurality of tunable signal paths in accordance with a frequency of signals detected by the detection unit.

12. The system of claim 11, further comprising a data structure including setting parameters for the plurality of tunable signal paths, and wherein the control unit is configured and operable to select setting parameters from said data structure for change of the settings of the at least one of the tunable signal paths.

13. The system of any one of claims 1 and 2, wherein the tunable multiplexer comprises a switching matrix configured to change an order of the signals frequencies provided over the plurality of RF ports into a new frequencies order fed into the plurality of tunable signal paths.

* * * * *